(12) United States Patent
Davis, Sr.

(10) Patent No.: US 7,713,032 B2
(45) Date of Patent: May 11, 2010

(54) HIGH PRESSURE TIDE ACTUATED FLUID PUMP

(76) Inventor: Albert Hamilton Davis, Sr., 215 W. 21st St., Little Rock, AR (US) 72206

( * ) Notice: Subject to any disclaimer, the term of this patent is extended or adjusted under 35 U.S.C. 154(b) by 0 days.

(21) Appl. No.: 12/385,359

(22) Filed: Apr. 6, 2009

(65) Prior Publication Data

US 2009/0196769 A1 Aug. 6, 2009

Related U.S. Application Data

(63) Continuation-in-part of application No. 11/492,162, filed on Jul. 25, 2006, now abandoned.

(60) Provisional application No. 60/704,373, filed on Aug. 2, 2005.

(51) Int. Cl.
*F04B 35/02* (2006.01)
(52) U.S. Cl. .................. 417/331; 417/333; 417/313
(58) Field of Classification Search ......... 417/330–333, 417/313; 60/497, 504
See application file for complete search history.

(56) References Cited

U.S. PATENT DOCUMENTS

| | | | |
|---|---|---|---|
| 680,357 A | 8/1901 | Rhoads | |
| 888,721 A | 5/1908 | Milbury | |
| 1,665,140 A * | 4/1928 | Master | 417/331 |
| 3,957,398 A | 5/1976 | Lloyd | |
| 3,970,415 A * | 7/1976 | Widecrantz et al. | 417/332 |
| 4,091,618 A | 5/1978 | Jackson | |
| 4,171,189 A * | 10/1979 | Schreiber | 417/332 |
| 4,421,991 A | 12/1983 | McLaughlin | |
| 4,563,248 A | 1/1986 | Anderson | |
| 5,435,134 A | 7/1995 | Nielsen | |
| 5,473,892 A * | 12/1995 | Margittai | 60/398 |
| 6,800,954 B1 * | 10/2004 | Meano | 290/53 |
| 7,402,028 B2 | 7/2008 | Wong | |
| 2004/0071566 A1 | 4/2004 | Hill, Jr. | |

* cited by examiner

Primary Examiner—Charles G Freay
(74) Attorney, Agent, or Firm—Richard C. Litman

(57) ABSTRACT

The high pressure fluid pump includes a driver defined by a float riding on the waves of a sea surface, a fluid pump housing, an impeller operatively attached to the driver and disposed within the fluid pump housing, a backflow check system connected to the fluid pump housing, and an outflow check system controlling the pressure, volume of fluid flow, and direction of fluid flow to various other systems. The pump may be used to pump fluids other than seawater and may include features multiplying pumping mechanical advantage for a given tidal range.

19 Claims, 16 Drawing Sheets

HIGH PRESSURE TIDE ACTUATED FLUID PUMP

CROSS REFERENCE TO RELATED APPLICATIONS

This application is a continuation-in-part of my prior patent application Ser. No. 11/492,162, filed Jul. 25, 2006, now abandoned, which claimed priority to provisional patent application Ser. No. 60/704,373, filed Aug. 2, 2005.

BACKGROUND OF THE INVENTION

1. Field of the Invention

The present invention relates to hydrokinetic energy conversion systems, more particularly, a high pressure fluid pump that converts tidal, wave, swell, wind, and or solar energy to usable energy in the form of a high pressure fluid pump, which may be used for various purposes, including generating power, producing potable water or general cleaning thereof through reverse osmosis membrane processes, irrigation for aqua farms, compressing gaseous fluids, creating vacuum, delivering fluids from one location to another, etc.

2. Description of the Related Art

Current energy demands require much use of dwindling fossil fuels, nuclear power or other costly man made substitutes. These demands cannot be met indefinitely without serious impact on the world economy or the environment.

Alternative energy producing methods have been proposed using natural resources such as solar, air, and water. Solar panels or related use of solar energy is widely well known. These solar energy conversion systems work well in providing alternative energy, but they still suffer from inefficient use of or energy conversion from the source. Moreover, they are a costly investment. Air power via windmills and derivatives thereof is another viable source of energy. However, it requires optimal geographic and weather conditions for these systems to work. Water energy conversion systems utilizing the natural power of the tidal forces have been proposed in an effort to use the immense mechanical energy created, but a significant amount of potential energy is eventually lost to the great heat sink of the seas without other benefits. All of the above systems are viable alternative energy sources, but widespread use have not been seen due to costs or inefficient use of the natural resource.

Thus, a high pressure fluid pump solving the aforementioned problems is desired.

SUMMARY OF THE INVENTION

The high pressure fluid pump includes a driver defined by a float riding on the waves of a sea surface, a fluid pump housing, an impeller operatively attached to the driver and disposed within the fluid pump housing, a backflow check system connected to the fluid pump housing, and an outflow check system controlling the pressure, the volume of fluid flow, and direction of the fluid to various other systems.

The pump includes features that may be modified to handle a variety of volumetric capacities and fluid pressures. Moreover, the pump may be used to pump fluids other than seawater. The pump may be used as a unit or in an array to meet predefined needs.

The high pressure fluid pump may include a tidal range multiplier to increase volumetric flow for a given tidal range.

The high pressure fluid pump may be powered by energy provided by the tide, by the swelling and ebbing of waves or swells, by the wind, and/or by solar energy, since all these elements factor in wave production.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to a high pressure fluid pump that converts energy from the tides, waves, swells, wind and sun into usable energy in the form of a high pressure fluid pump for generating power, producing potable water or general cleaning thereof through reverse osmosis membrane processes, irrigation for aqua farms, compressing gaseous fluids, creating vacuum or delivering fluids from one location to another, etc.

Figure 1:
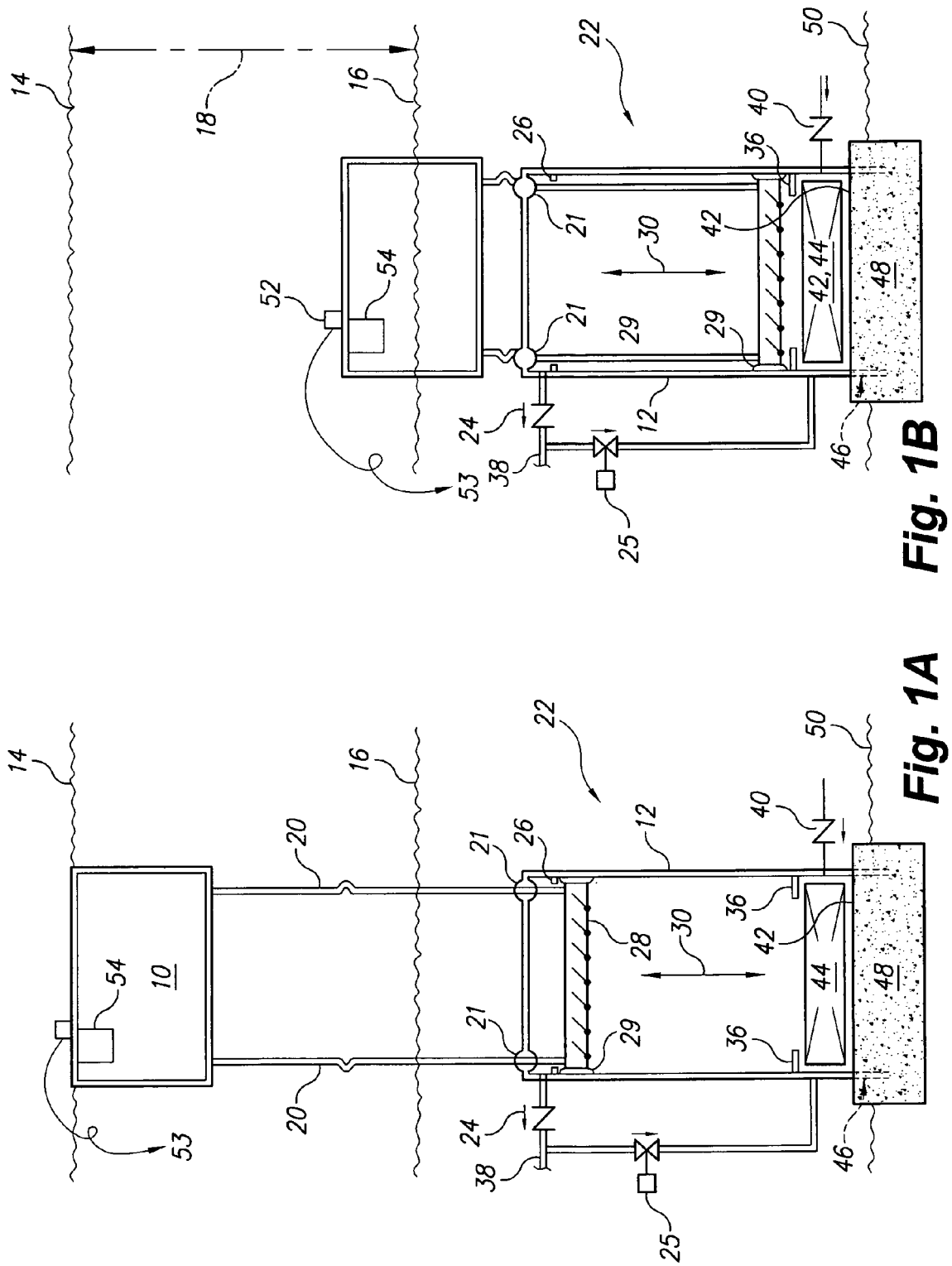
FIG. 1A is a diagrammatic view of a high pressure fluid pump according to the present invention operating at high tide.
FIG. 1B is a diagrammatic view of the pump of FIG. 1A operating at low tide.
Figure 2:
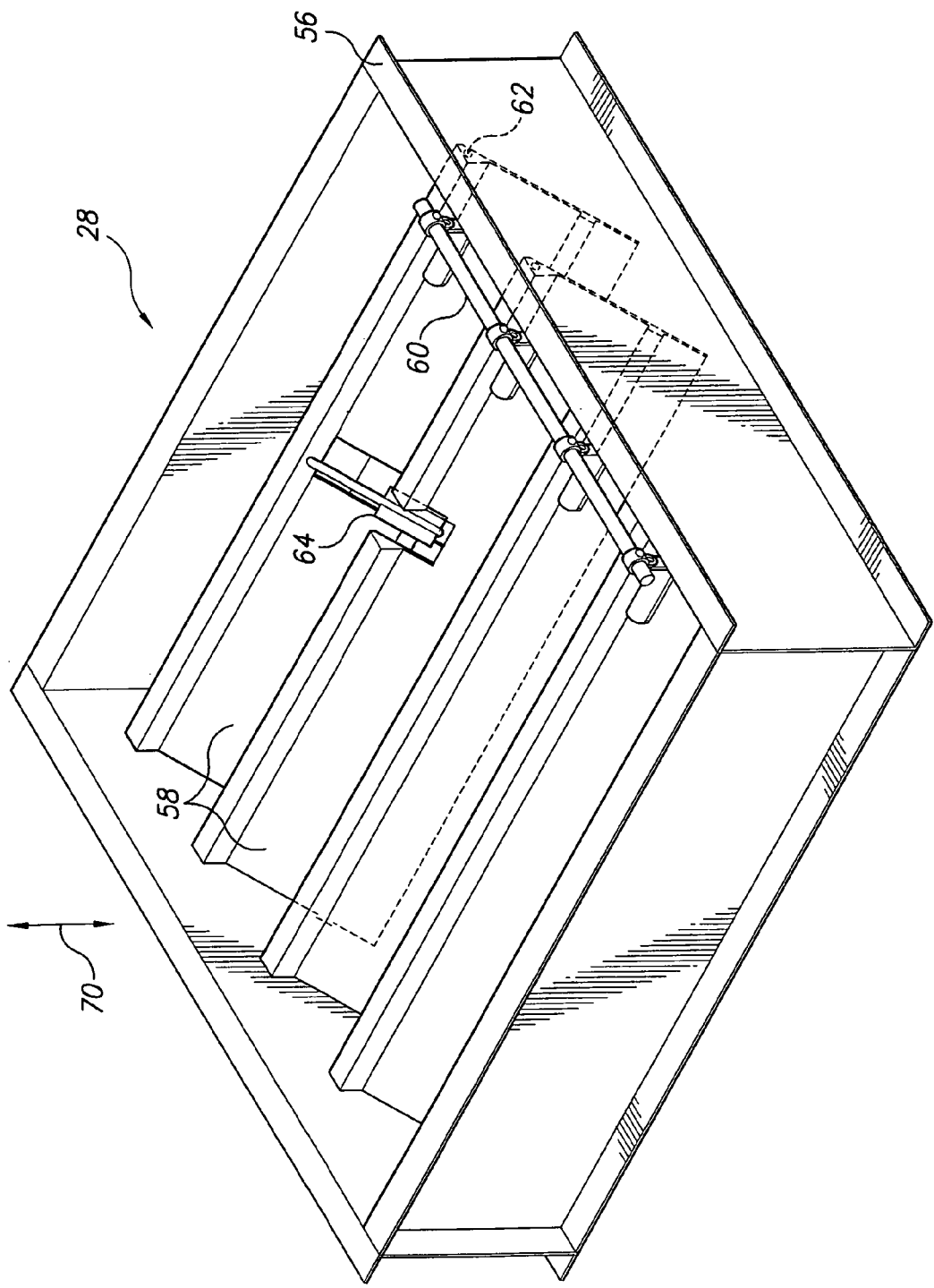
FIG. 2 is a perspective view of an impeller of a high pressure fluid pump according to the present invention.

Referring to FIGS. 1A, 1B, and 2, the high pressure fluid pump 22 includes a driver defined by a float 10 riding on the waves of the sea and a plurality of cables 20 depending from the float 10 and operatively attached to a fluid impeller 28 reciprocating within a pump housing 12 as indicated by arrows 30. The pump housing 12 is seated on a foundation 48 embedded on the sea floor 50. Edge seals 29 minimize leakage on the edges of impeller 28. A controller 54 monitors operations of the pump 22. The controller 54 includes a battery, controls and communications powered by a solar collector or panel 52. Conduits or conductors 53 relay information and commands to the backwash valve 25.

When pumping seawater, the interior of pump 22 is open to sea through inlet 42. The float 10 rides on high and low tides 14, 16 over tidal range 18 making and releasing tension in cables 20 which raise and lower the impeller 28 inside pump 22. When tide is falling from high tide 14, blades 58 in impeller 28 are pushed open as the impeller 28, with an average density greater than water, falls by gravity, allowing seawater under pressure to move from sea through an open inlet 42 and move through the blades 58 in impeller 28 to a discharge backflow prevention valve 24, which prevents backflow. On initial start up of a new pump, seawater will rise through the impeller 28 and discharge through backflow prevention valve 24 and pipe 38 to sea level.

Water seeks its own level. On any tide rise, the blades 58 in impeller 28 will close because pressure on the top side of the impeller 28 is higher than pressure on the bottom side, since water cannot be compressed. While water above impeller 28 is being discharged, water is rising on the inlet side of 28 due to seawater pressure. Stops 26 limit the rise of the impeller 28 to prevent blocking of discharge of fluid through backflow valve 24. The stops 36 limit fall of the impeller 28 to prevent blocking of intake of seawater through opening or inlet 42 or intake of other fluids through backflow valve 40.

On the first tide rise, seawater will be raised the same distance as the tidal range 18 less allowance for submersion of the float 10 to create its buoyancy. On the second tidal rise, seawater will be raised an additional distance equal to the tidal range 18 less allowance for submersion of the float 10 and so on to whatever discharge pressure or elevation is possible with the volumetric and buoyancy parameters of the float 10. A wide variety of modifications may be implemented with respect to the float 10 as long as the float volume can be increased and equipment can be built to withstand higher pressures.

The volume and weight of water lifted during each rise of a tide is determined by the face area of the sliding linear impeller 28 and the tide range less allowance for float 10 submersion to create buoyancy. Pump discharge pressure is increased by adding volume above that required to lift the weight of water and moving lift components of pump 22 to the float 10, resulting in greater buoyancy. There are two tides a day. If the tidal range 18 exceeds the design range, the lift volume will increase for that tide if the impeller 28 travel space has clearance allowing for tides above the normal tidal range 18. Maximum possible buoyancy occurs whenever the float 10 is completely submerged and pressure will not increase as tide advances higher. The dead weight required to keep pump anchored will equal the uplift force caused by float 10 plus a reasonable safety factor. Any excess float volume above sea level will allow an increase in lift pressure when tides exceed design tide, requiring additional anchor dead weight.

Provisions have been made to allow backflow of high pressure seawater to the screen and strainer or filter 44 that keeps out sea life and debris at water flow inlets 42. When tide is above low tide and not rising, a motorized backflow valve 25 can be opened, allowing pressurized seawater to backwash and flush clean the filter 44. In lieu of backflow valve 25, provisions may be made to lift the filter 44 out, clean and/or replace, and re-install the filter 44. In this case, a spare filter for instant change out will be desirable. There will be no cavitation in the pump 22, as inlet pressure will always be positive relative to atmospheric pressure.

When using the pump 22 to pump seawater under pressure, seawater is generally returned to be sea. However, some of the seawater may be diverted to other uses, such as reverse osmosis production of potable water, aquaculture farms, aquariums, any type of upwellers, and offshore fish farms on land or at sea.

Figure 3A:
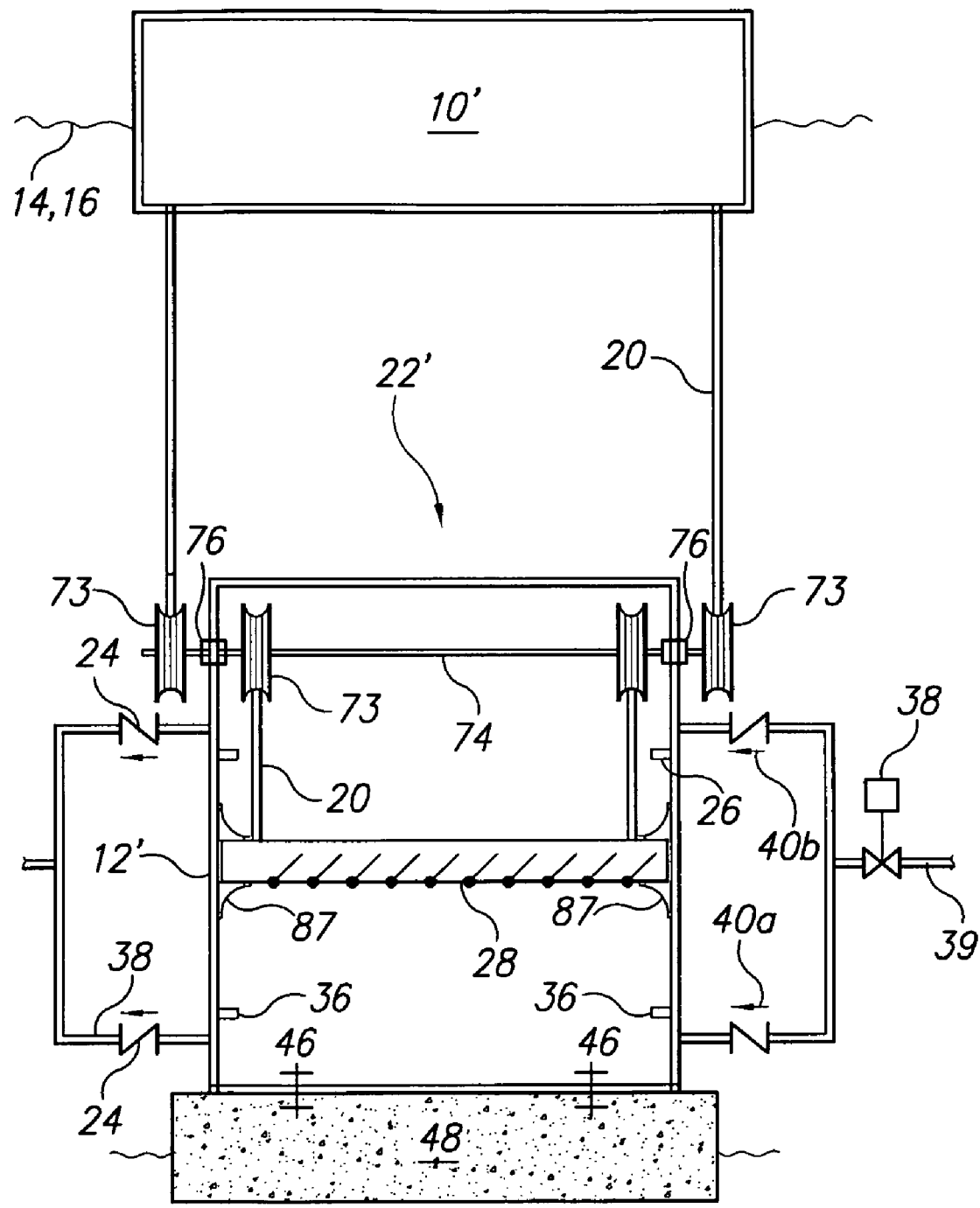
FIG. 3A is a diagrammatic view of a second embodiment of a high pressure fluid pump according to the present invention that may be used for pumping fluids other than seawater.
Figure 3B:
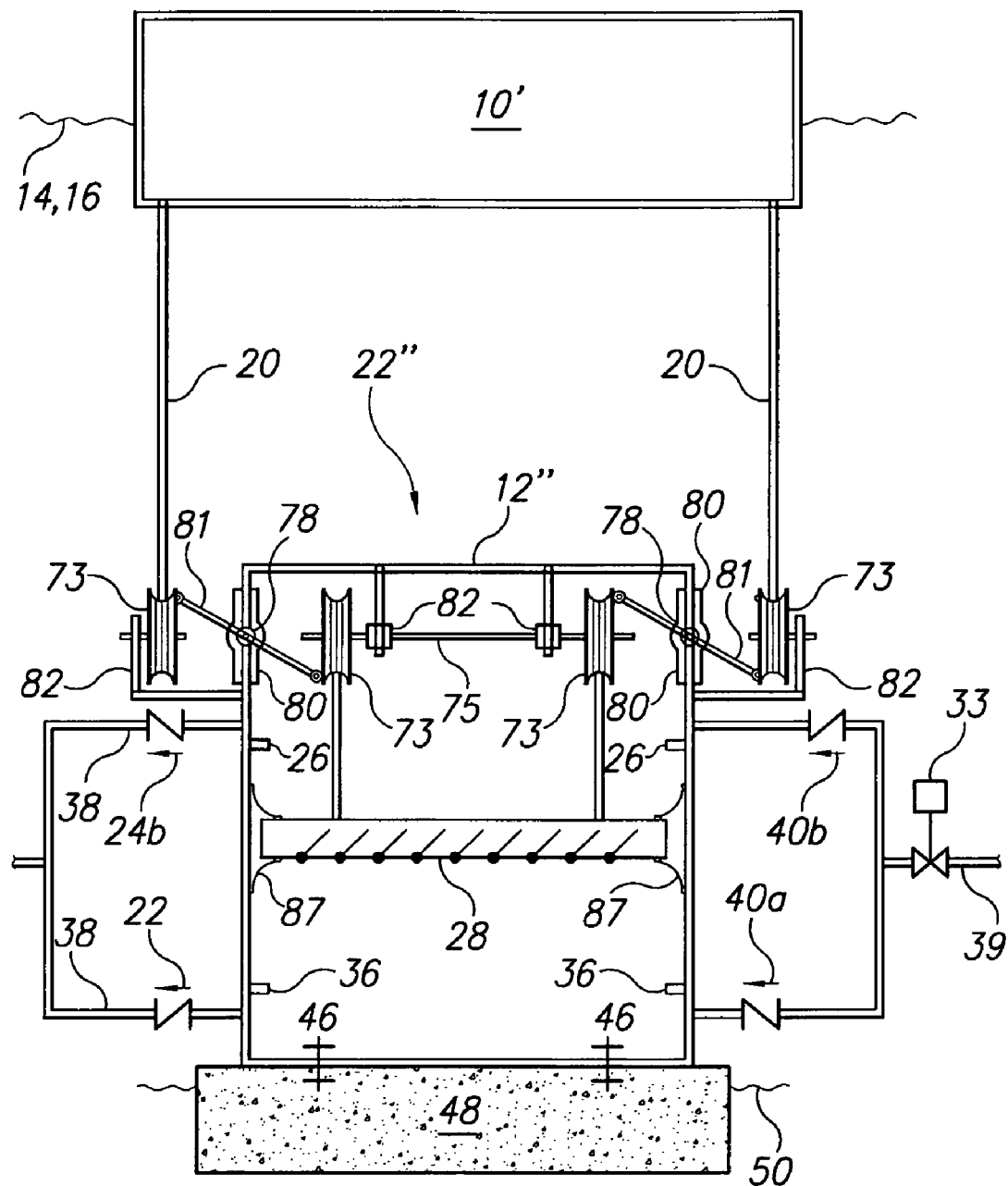
FIG. 3B is a diagrammatic view of a third embodiment of a high pressure fluid pump according to the present invention, which also may be used for pumping fluids other than seawater.

Possible leaks may occur from high pressure seawater inside pump 22 where the lifting cables 20 pass through the top of pump housing 12. Seals 21 should be provided to minimize leakage and assure the highest possible pump efficiency. In general, excessive leaking should be minimized, since it reduces pump efficiency. It is noted that the embodiment of the high pressure fluid pump 22 shown in FIGS. 1A and 1B should not be used for pumping fluids other than seawater and potable water, as leakage of pumped fluids may contaminate seawater at the equipment location. The pumps disclosed in FIGS. 3A and 3B show modifications to prevent leakage when pumping fluids other than water. It may be that, at some point, higher discharge pressures will reach the point where leakage at seals 21 is excessive, and use of a high pressure fluid pump of the type shown in FIGS. 3A and 3B may be necessary for pumping seawater in lieu of pump 22.

Referring to FIG. 2, the sliding fluid impeller 28 is a modified form of a heavy duty, adjustable counterbalance backdraft damper of the type used in the air conditioning industry. The impeller 28 includes a sturdy frame 56 that houses and supports a plurality of pivotally mounted impeller blades 58, which are shown in partially open positions. A linkage 60 ties blades 58 so the blades 58 move together. When axle 62 rotates, the damper blades 58 open and close.

An adjustable counterbalance 64 allows for adjustment of the sensitivity of blades 58 to pressure changes that cause the impeller blades 58 to open and close. Arrows 70 indicate the direction of fluid flow. Single blade impellers may be also be used.

The pumps shown in FIGS. 3A and 3B are configured to pump fluids other than seawater. These pumps operate in substantially the same manner as the pump disclosed above, except as noted herein. Some of the noted differences between the pumps are indicated by either a single prime or double prime next to the respective reference numbers.

Initially, it is noted that pumps 22' and 22" do not include the pump inlet components 42, 44 of pump 22. The inlet in pumps 22' and 22" is closed and replaced by an inlet backflow valve system 40 through piping fluid sources. These fluids do not rise to sea level as a result of seawater pressure. Fluid pressure will move fluid to some point below or above sea level, depending upon the resultant pressure at inlet due to pump 22' or pump 22". These pumps 22', 22" are configured to increase the pressure from resultant inlet pressure to whatever pressure is required at the point of use to compensate for pressure loss experienced by the fluid in reaching that point. In this configuration, the inlet pressure must always be high enough to avoid cavitation. The motorized flow valve 33 at the fluid source line 39 controls optimum inlet pressure and may be used as a stop flow valve if maintenance is necessary. The pumps in FIGS. 3A and 3B are configured so that the respective pump housing 12', 12" is not penetrated by the cables 20 where leakage of fluids from inside the pump housing 12', 12" to the sea may occur, contaminating the seawater.

In FIG. 3A, the pump 22' includes four pulley cable spools 73 coaxially mounted on shaft 74. Two of the spools 73 are mounted outside the pump housing 12'. The remaining two spools 73 are mounted inside the pump housing 12' on the discharge side of impeller 28. One set of cables 20 depend from the float 10' at one end while the other end of the cables 20 are wound around the outside spools 73. One end of another set of cables 20 is wound on the inside spools 73 and the opposite end of the cables 20 is operatively attached to the impeller 28 within the pump housing 12'. Thus, when low tide 16 rises, the float 10' rises pulling the outside cables 20 upward which rotates the outside spools 73. In turn, rotation of the outside spools 73 causes concurrent rotation of the inside spools 73 winding the inside cables 20 to thereby lift impeller 28 and discharge fluid out of pump housing 12' through backwater valve 24. Bearing seals 76 where the shaft 74 penetrates pump housing 12' prevents leakage of fluid from inside the pump housing to seawater outside. Edge seals 87 on the perimeter of impeller 28 prevent leakage of fluids from above to below the impeller 28. When high tide 14 falls, the float 10' falls and the above process is reversed.

In FIG. 3B, the operation of the pump 22" is the same as pump 22', except that the bearings seals 76 have been replaced with spherical oscillating bearings 78 and flexible seals 80. The oscillating, non-rotating shaft 78 to which spools 73 are connected by permanently lubricated ball joints outside pump housing 12" are mounted on individual short shafts supported by spool shaft supports 82. Spools 73 inside the pump housing 12" are mounted on a common shaft 75 supported by shaft supports 82. Spools 73 are connected to oscillating, non-rotating shaft 78 with permanently lubricated ball joints. Since the oscillating non-rotating shaft 78 is solidly connected to non-rotating shaft and the pump housing 12" wall, there is no possibility of leakage unless the flexible seal 80 rips or develops holes. This is not likely because the flexible seal will be very slack and entirely non-stressed. Water pressure on both sides of pump housing 12" will cause flexible seal 80 to cling tightly to the pump housing 12" wall. Life without leakage for flexible seal 80 in FIG. 3B will be considerably longer that of bearing seals 76 in FIG. 3A.

In both pumps 22', 22", stops 26 limit rise of the impeller 28 to prevent blocking of discharge of fluid through back flow prevention valves 24. Stops 36 limit fall of impeller 28 to prevent blocking of fluid through backflow valves 40a, 40b. Anchored legs 46 firmly mounts the respective pump housing 12', 12" to the foundation 48 resting in or on sea bed 50.

Figure 4:
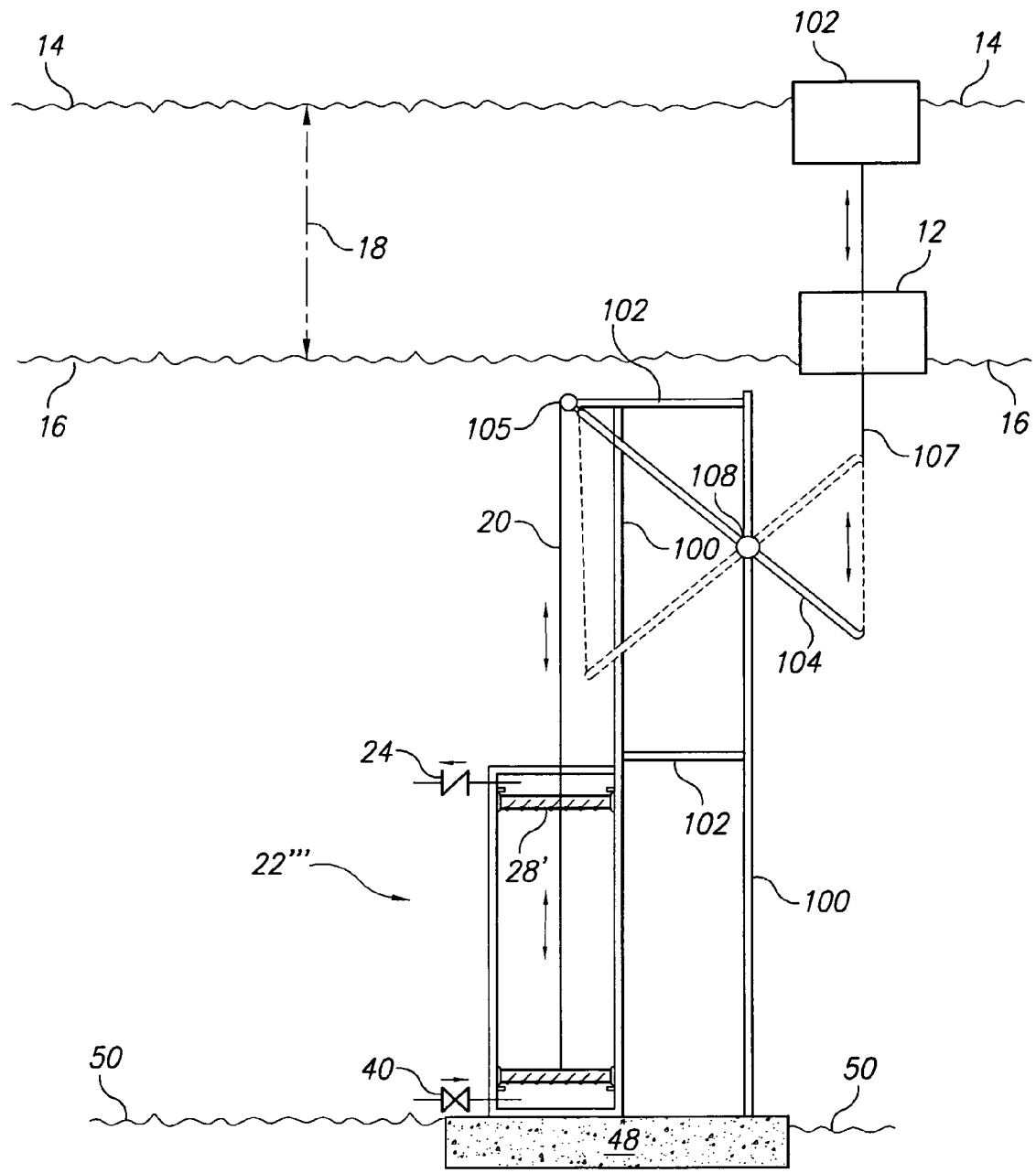
FIG. 4 is a sectional view of a fourth embodiment of the economical wave energy powered high pressure fluid pump according to the present invention with a tidal range multiplier.

Referring to FIG. 4, initially it is noted that differences between the pumps are indicated by a triple prime next to the respective reference numbers. In all respects, except as explained below, the operation of the pump 22''' is the same.

In the embodiment shown in FIG. 4, the pump 22''' includes a lever arm column 100 supporting a lever arm axis bearing 108. Braces 102 tie lever arm columns 100 together. Pump housing 12''' is attached to foundation 48, which rests in or on the sea bed 50. At least one cable 107 operatively connects the float 10''' to one end of the lever arm 104. The other end of the lever arm 104 includes at least one cable 20 wound around a pulley 105 at the distal end of the upper brace 102. The cable 20, in turn, is operatively attached to the impeller 28'.

To illustrate multiplying the tidal range, assume that available tidal range 18 is ten feet between average high tide 14 and average low tide 16. The economics and design require a twenty-foot tidal range 18. Leverage can be used to convert ten-foot tidal range 18 to a twenty-foot tidal range 18, increasing the volume of water lifted during each tide. The buoyancy of the float 10''' will be increased to lift additional weight of water and maintain desired lift or discharge pressure. In addition, the desired discharge pressure or lift can be increased to any suitable level by adding more float volume.

Allowances must be made to account for submersion of float 10'''. Assume that the design causes the float to submerge thirty percent of the available tidal range 18. Thirty percent of the tidal range 18 is three feet, leaving seven feet for lift. When float 10''' rises and the real tidal range is ten feet, the cable 107 pulls the right end of lever arm 105 up seven feet and the left end of lever arm 105 falls fourteen feet, allowing the weight of the impeller 28' to make it fall fourteen feet as it pulls cable 20 downward. As impeller 28' falls, positive pressure on the bottom of the impeller 28' opens the blades 58 to thereby allow fluid to rush through toward the top. When the process is reversed, fluid pressure on the top side of impeller 28' is higher than pressure on the bottom side, and fluid is pushed upward and discharges through backflow prevention valve 24.

As an example, assume that it is desired to store seawater at some high elevation or pressure. Assume the weight of the seawater is 64 pounds per cubic foot (pct). Converted to pounds per square inch (psi), 64 pcf=0.44444 psi. Divide 1.0 psi by 0.44444=a column of seawater 2.25 feet tall. Assume the seawater is used to drive a turbine. One hundred psi is required at turbine. Assume a psig loss of 10% in the delivery system. Pump discharge pressure will have to be 110 psi to have 100 psi at turbine. Pressure of 100 psi is equivalent to pumping seawater to 247.5 feet above sea level. To get buoyancy, float 10''' must become submerged reducing available lift per tide. Assume a 30% loss of lift per tide to account for submersion of the float. The available lift per tide is 20 feet times 70%=14 ft. To obtain lift and volume desired, seawater must be pumped to storage at 247.5 ft. elevation above sea level by two tides per day. Pump 22''' or an array of pumps 22''' will be sized to deliver full required daily demand by two tides a day every day. When pumping seawater, inlet side of the impeller 28' is open to seawater pressure at pump 22''' location.

Impeller blades 58 for the impeller 28' are counterbalanced and function in the same way as back flow preventer 24. Impeller 28' is heavier than seawater. When the tide goes down, water pressure on the impeller 28' on the bottom side is higher than pressure on top side. Seawater flows to the top side of impeller 28'. When tide rises, pressure becomes higher on top side of impeller 28' and impeller 28' closes and water is lifted and discharged through a back flow preventer 38.

Figure 5:
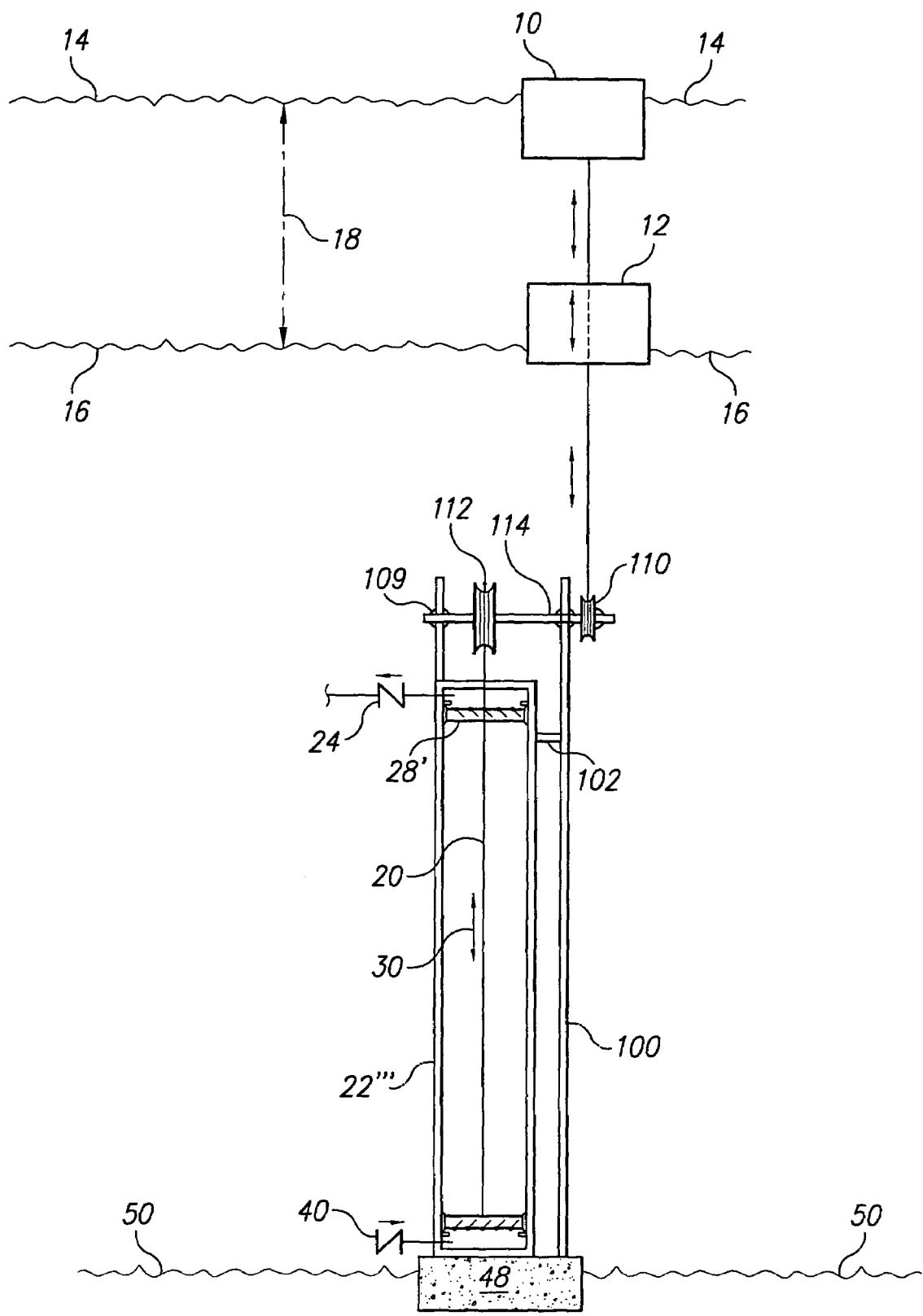
FIG. 5 is a diagrammatic view of a fifth embodiment of a high pressure fluid pump according to the present invention having an alternative tidal range multiplier.

Referring to FIG. 5, initially it is noted that differences between the pumps are indicated by a quadruple prime next to the respective reference numbers. In all respects, except explained below, the operation of the pump 22'''' is the same as above with respect to pump 22'''.

In the embodiment shown in FIG. 5, the pump 22'''' includes at least one shaft support column 100' supporting a pulley shaft 114 mounted through pulley shaft bearings 109 on the at least one pulley shaft column 100'. Braces 102' tie shaft support column 100' to the pump housing 12'''' to stabilize the overall structure. Pump housing 12'''' is attached to foundation 48 which rests in or on the sea bed 50. A small diameter pulley 110 is mounted outside the support column 100' and a large diameter pulley 112 is mounted between the support columns 100'. At least one cable 107 operatively connects the float 10'''' to the smaller pulley 110. At least one cable 20 is wound around the large pulley 112 and operatively attached to the impeller 28'.

To illustrate multiplying the tidal range in this embodiment, assume that available tidal range 18 is ten feet between average high tide 14 and average low tide 16. The economics and design require a twenty foot tidal range 18. Leverage using a large pulley 112 and small pulley 110 can be used to convert a ten foot tidal range 18 to a twenty foot tidal range 18 increasing the volume of water lifted during each tide. Buoyancy of float 10'''' will have to be increased to lift additional weight of water and maintain desired lift or discharge pressure. In addition desired discharge pressure or lift can be increased to any suitable level by adding more float volume either by additional floats or increasing the size of the float.

Allowances must be made to account for submersion of float 10''''. Assume design causes float to submerge thirty per cent of available tidal range 18. Thirty per cent of tidal range 18 is three feet leaving seven feet for lift. When float 10'''' rises and the real tidal range 18 is ten feet, cable 107 unravels seven feet of cable from small pulley 110 on shaft 114 to rotate causing large pulley 112 to rotate an equal angle pulling in fourteen feet of cable into pulley 112 spool to thereby lift impeller 28' fourteen feet allowing fluid to enter from the bottom of impeller 28' from intake back flow prevention valve 40 or 42, 44 (FIGS. 1A and 1B) intake and discharge through one way fluid discharge back flow prevention valve 24. When the float 10'''' rises, the process is reversed except fluid pressure on top side of impeller 28' is higher than the pressure on the bottom side and fluid is pushed upward and discharges through back flow prevention valve 24.

As an example, assume that you want to store seawater at some high elevation. Assume weight of seawater is 64 pounds per cubic foot (pcf). Converted to pounds per square inch (psi), 64 pcf=0.44444 psi. Divide 1.0 psi by 0.44444=a column of seawater 225 feet tall. Assume seawater is used to drive a turbine. One hundred psi is required at the turbine. Assume a psi loss of 10% in the delivery system. The pump discharge pressure will have to be 110 psi to have 100 psi at turbine. Pressure of 100 psi is equivalent to pumping seawater to 225 feet above sea level. Pressure of 110 psi is equivalent to pumping seawater to 247.5 feet above sea level. To get buoyancy, float must become submerged reducing the available lift per tide. Assume 30% loss of lift per tide to account for submersion of float. The available lift per tide is 20 ft. times 70%=14 ft. To obtain lift and volume desired, seawater must be pumped to storage at 247.5 ft. elevation above sea level by two tides a day divided by 2 times 14 ft=approximately 8 days. The pump or pump array will be sized to deliver the full required daily demand by two tides a day every day.

Thus, the above is a system for pumping fluids using a float as a driver that rides on tides, swells, waves, and wind on the sea, lowering and raising a sliding fluid impeller. The pump will move fluids over entire tides, swells, waves and wind movements less the depth of submersion of float. Every up movement of sea surface for any reason causes water to discharge through one way discharge backwater valves.

When pumping fluids, the volume of the float is determined from buoyancy necessary to pump fluid by raising weight of fluids and equipment components, which move up and down and overcome resistance to flow. Discharge pressure or lift can be increased to any manageable pressure simply by increasing volume of float over the minimum volume necessary to pump fluids by raising weight of fluids and equipment components which move up and down and overcome resistance to flow in valves and pipes. Only limitation to high pressure is ability of pump equipment to withstand high pressures and only limitation to capacity is the availability of enough space and water depth to install and operate multiple pumps and pumps with larger impeller faces. Water can be lifted to any reasonable elevation or pressure if pump can withstand the pressures produced. The capacity may be increased by increasing impeller face area or creating an array of pumps with multiple floats and impellers.

The pump will operate at any manageable depth in any ocean or sea where the tides, swells and waves are adequate to make pump perform the work. The pump is non-polluting and uses no fossil fuel, nuclear, or man made source of energy. Thus, the fuel costs are zero. The only costs are equipment, installation, operation and maintenance.

Modified pumps will pump any liquid fluids and compress air and any gas. When large volumes of liquids or gases are pumped, piston rings and seals are not necessary because one way valves will not allow back flow. Minimal leakage of fluid at edges of impellers and blades will provide sufficient lubrication. Pump will function as long as equipment is properly operated and maintained. There are no controls, rotating shafts or bearings when pumping seawater and potable water.

Impeller shown is a modified heavy duty adjustable counterbalance back draft dampers used in air conditioning industry. It is made from materials suitable for use in seawater and other fluids being pumped. Because the specific gravity of the impeller is greater than the specific gravity of water, the impeller will sink when height of the tides, swells, and waves decreases allowing the impeller to move open. As the impeller falls, fluid flows from bottom side to top side of the impeller. When tide is rising, pressure on top side of impeller will be greater and force it to shut tight and fluid will be forced upward under pressure to one way discharge backflow valve (s). Fluids other than seawater will have an additional backflow valve in the fluid intake to the pump. Clearances between impeller and its housing will allow negligible leakage in relation to the total volume of fluid pumped and will serve as lubricant for dampers. Pumps that pump seawater will have no backflow valve on the inlet side and will always be open to the sea on the inlet side of the impeller. Seawater seeks its own level and will rise through the pump discharge unless otherwise restricted. When fluids other than seawater are pumped, inlet pressure to impeller will be pressure of the fluid available from fluid source. When the impeller rises, fluids will be drawn into to under side of impeller.

When the pump is used to drive turbines to generate power, turbines can be located at or above sea level or even below sea level. If liquid fluids are used, they must be stored at an elevation above the turbine whereby the weight of the fluid causes adequate fluid pressure to drive turbine and provide required power output. Liquid fluids may be stored anywhere in pressure tanks designed and located to provide desired turbine operating pressure. When air and other gaseous fluids are used, fluids can best be stored just about anywhere in pressure tanks above or below sea level as long as losses in the distribution system are taken into account.

Turning now to the embodiments shown in FIGS. 6-11, the pumps in these embodiments utilize wave energy at both the rise and fall of the tides. The previous embodiments converted the wave energy to mechanical energy when the tides are rising.

Figure 6:
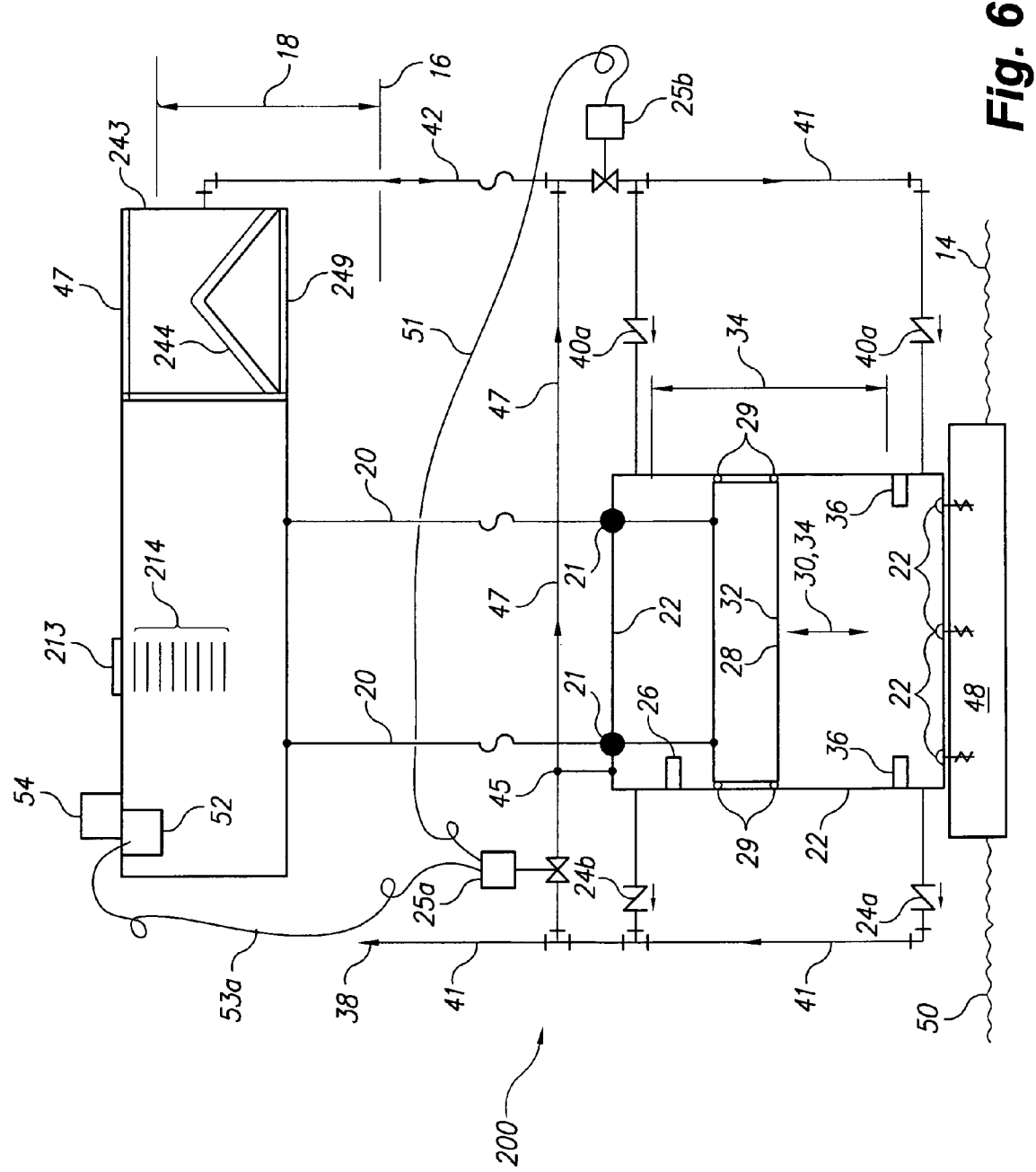
FIG. 6 is a diagrammatic view of a sixth embodiment of a high pressure fluid pump according to the present invention, shown operating at high tide.
Figure 7:
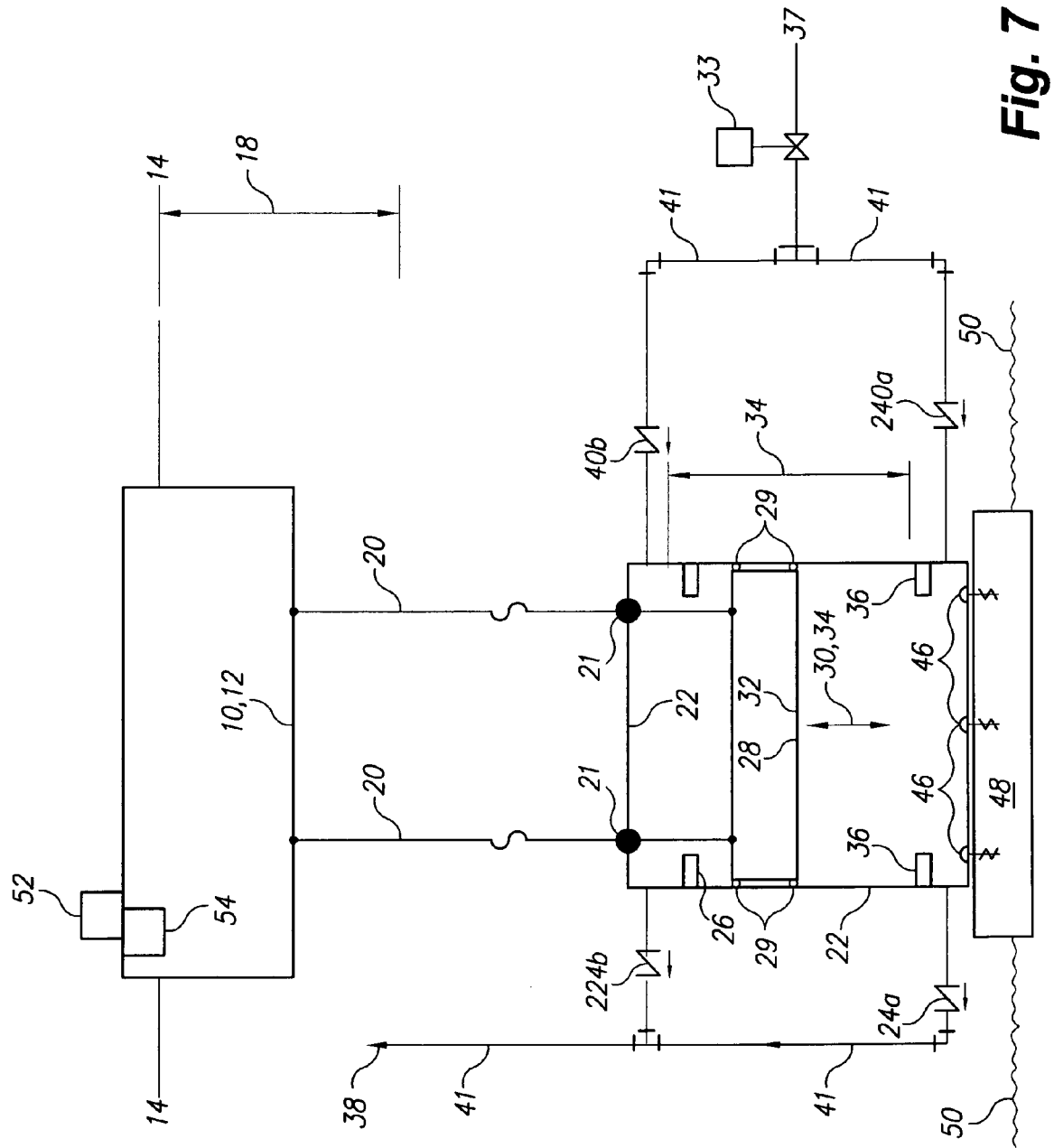
FIG. 7 is a diagrammatic view of the high pressure fluid pump of FIG. 6, shown operating at low tide.

Referring to FIGS. 6 and 7, the high pressure fluid pump 200 includes a driver defined by a float 210 riding on the waves of the sea and a plurality of cables 20 depending from the float 210 and operatively attached to a fluid impeller 228 reciprocating within a pump housing 212 as indicated by arrows 30. The pump housing 212 is firmly seated on a foundation 48 by anchors 46, and the foundation in turn is embedded on the sea floor 50. Edge seals 229 minimize leakage on the edges of impeller 228. There are preferably two or more edge seals 229 running horizontal around the weighted impeller 228. A controller 254 monitors operations of the pump 200. The controller 254 includes a battery, controls and communications powered by a solar collector or panel 252. Conduits or conductors 253 relay information and commands to the backwash valve 225A.

When pumping seawater, the interior of pump 200 is open to sea through two inlet valves 240a, 240b, which are interconnected by rigid pipe 241 and connected to automatic valve 225b. The backwash valve 225a is in operative communication with the automatic valve 225b via pipe 241 and conduit 251. A flexible pipe 242 connects the automatic valve 225b to a filter float housing 243, which is attached to the float 210 and floats therewith at sea level. Filter float housing 243 includes filters 244 and a screen 249. The top of the filter float housing 243 has a hinged access panel 247 to allow cleaning and/or changing of the filters and screen. The access panel 247 also prevents air from entering the filter float housing 243. The float 210 may also include a lighted maintenance access panel 213 atop the float 210 and a ladder 214 interior of the float 210 to allow maintenance to enter the float 210.

As the float 210 rides the high and low tides 14, 16 over tidal range 18, it generates and releases tension in the cables 20, which respectively raise and lower the impeller 228 inside pump housing 212. When the tide is falling from high tide 14, impeller 228 applies pressure to fluid below the impeller 228 forcing it to discharge through outlet back flow prevention valve 224a to point of use or storage and fluid is pulled in to the top side of the impeller 228 through inlet back flow prevention valve 240b. When the tide rises, fluid above the impeller 228 is pressurized and forced out through back flow prevention valve 224b to point of use or storage while fluid is pulled in to the bottom side of the impeller 228 through inlet back flow prevention valve 240a.

Stops 226 limit rise of the impeller 228 to prevent blocking of discharge of fluid through backflow valve 224b and intake of seawater opening through backflow valve 240b. Stops 236 limit fall of the impeller 228 to prevent blocking of discharge of fluid through backflow valve 224a and intake of seawater opening through backflow valve 240a.

On first tide rise, seawater will be raised the same distance as tidal range 18 less allowance for submersion of float 210 to create its buoyancy. On second tidal rise, seawater will be raised an additional distance equal to tidal range 18 less allowance for submersion as float 210 creates additional buoyancy and so on to whatever discharge pressure or elevation is possible with the configuration of the float volume or weight of impeller 228. A wide variety of modifications may be implemented with respect to the float 210 as long as the float volume can be increased and weight can be increased to the impeller 228 and equipment can be built to withstand higher pressures.

Volume and weight of water lifted during each rise of a tide is determined by the face area of impeller 228 and tide range less allowance for float submersion to create buoyancy. Pump discharge pressure is increased by adding volume above that required to lift the weight of water and moving lift components of pump 222 to the float 210 resulting in greater buoyancy.

There are two tides a day. If the tidal range 18 exceeds the design range, the lift volume will increase for that tide if the impeller travel space has clearance allowing for tides above the normal tidal range 18. Maximum possible buoyancy occurs whenever the float 210 is completely submerged and pressure will not increase as tide advances higher. The dead weight required to keep pump 222 anchored will equal the uplift force caused by float 210 plus a reasonable safety factor. Any excess float volume above sea level will allow an increase in lift pressure when tides exceed design tide requiring additional anchor dead weight.

When using the pump 200 to pump seawater under pressure, seawater is generally returned to the sea. However, some of the seawater may be diverted to other uses such as reverse osmosis production of potable water, aquaculture farms, aquariums, any type of upwellers and offshore fish farms on land or at sea.

Figure 9A:
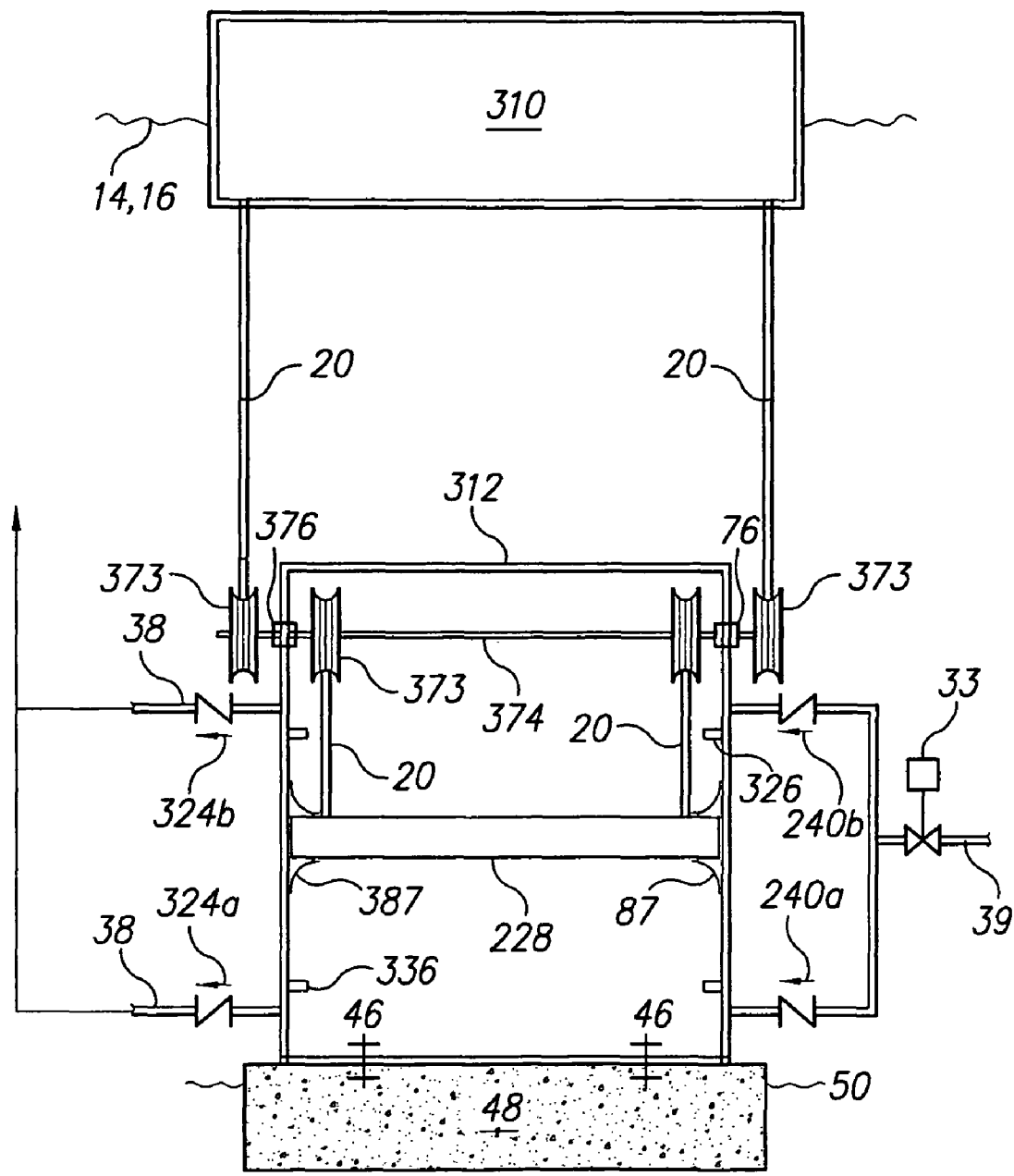
FIG. 9A is a diagrammatic view of a seventh embodiment of a high pressure fluid pump according to the present invention for pumping fluids other than seawater.
Figure 9B:
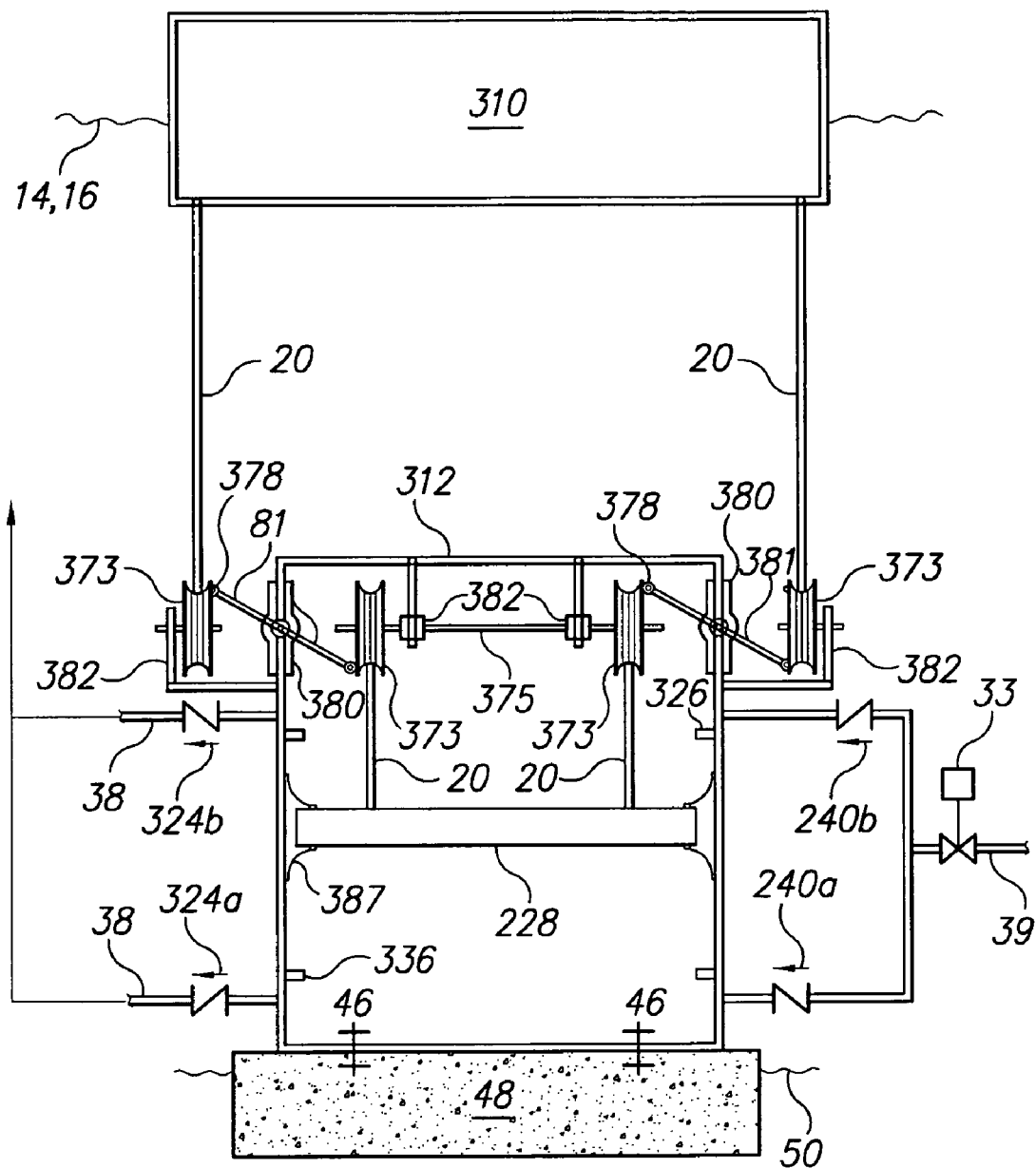
FIG. 9B is a diagrammatic view of an eighth embodiment of a high pressure fluid pump according to the present invention, which is also for pumping fluids other than seawater.

Possible leaks may occur from high pressure seawater inside pump 200 where the lifting cables 20 pass through the top of pump housing 212. Preferably four or more cables should be utilized depending on the sizes of the float and impeller and the desired tension in the cables. Seals 21 should be provided to minimize leakage and assure the highest possible pump efficiency. In general, excessive leaking should be minimized, since it reduces pump efficiency. It is noted that the pump 200 as shown in FIG. 6 should not be used for pumping fluids other than sea and potable water as the leakage of pumped fluids may contaminate seawater at the equipment location. If it is desired to pump fluids other than seawater, the pump 200 may be modified as shown in FIG. 7 so that the filter housing 249 and the associated lines are eliminated. Instead, a motorized valve 33 regulates flow of fluid (other than seawater) from the source line or pipe 39 to the inlet backflow valves 240a and 240b. In addition, the pumps disclosed in FIGS. 9A and 9B show modifications to prevent leakage when pumping fluids other than water. It may be that at some point, higher discharge pressures will reach the point to where leakage at seals 21 is excessive, and use of the pump FIGS. 9A and 9B may be necessary for pumping seawater.

Figure 8:
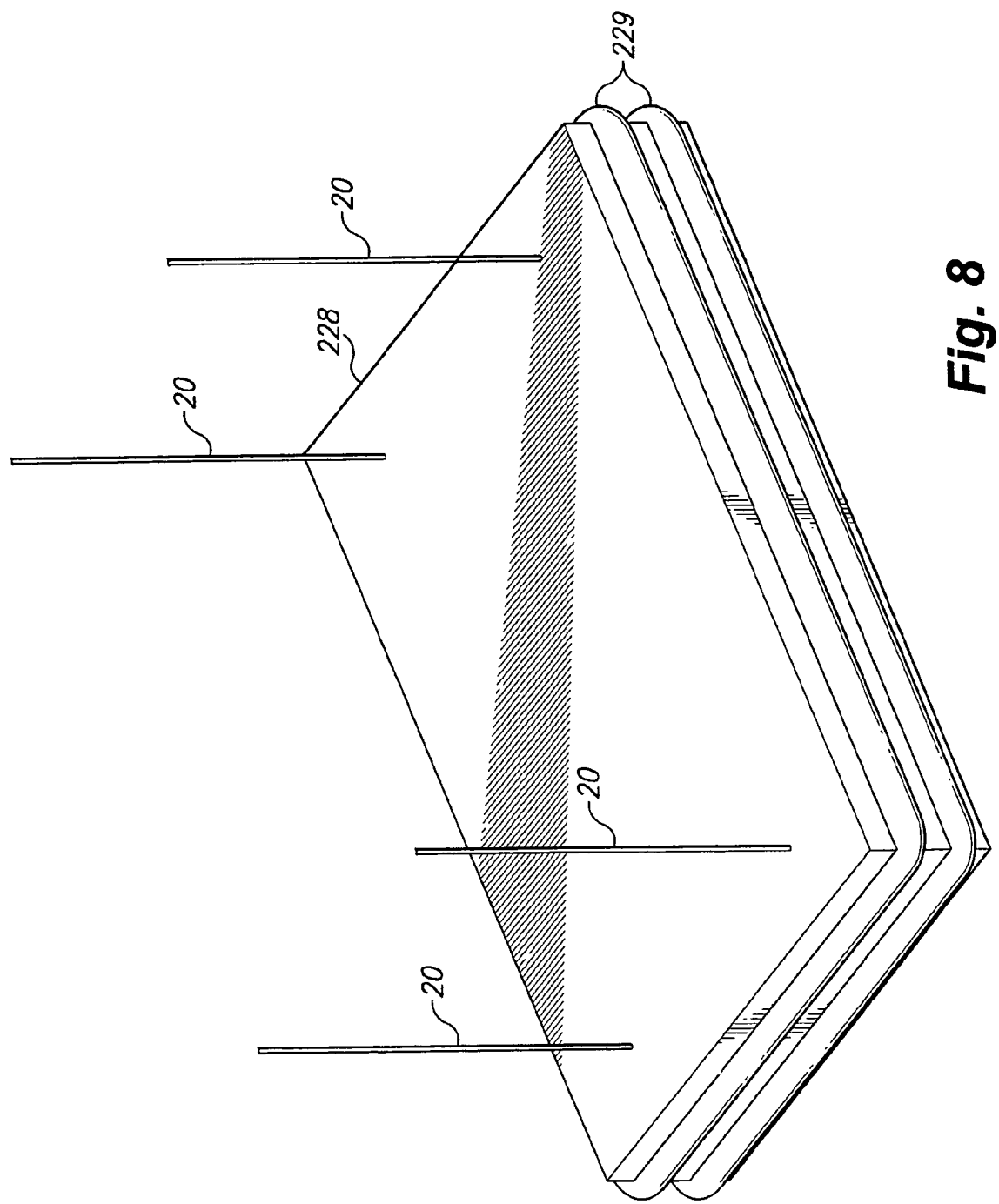
FIG. 8 is a perspective view of the impeller of the high pressure fluid pump of FIGS. 6 and 7.

Referring to FIG. 8, the solid fluid impeller 228 of the current alternative embodiments of the pump is a substantially rectangular block sized to fit inside the housing 312. The impeller 228 has a weight that is specific for the load demands of the pump, and the weight may be changed by materials, the density of the material and/or adding/subtracting attachable weights thereto. It is preferable to include at least four cables 20 to attach the impeller 228 to the float 210, since this configuration provides a stable operation of these component. It is also preferable to attach at least two horizontally running edge seals or rings 229 for the necessary pumping operation of the impeller 228 in both the up and down directions.

The pumps disclosed in FIGS. 9A-9B are configured to pump fluids other than seawater. These pumps operate in substantially the same manner as the pumps disclosed above, except as noted herein.

The fluids pumped in these embodiments of the pump do not rise to sea level as a result of seawater pressure. Fluid pressure will move fluid to some point below or above sea level, depending on resultant pressure at the inlet to pump 300. The pump 300 is configured to increase the pressure from resultant inlet pressure to whatever pressure is required at the point of use to compensate for pressure loss experienced by the fluid in reaching that point. In this configuration, the inlet pressure must always be high enough to avoid cavitation. The motorized flow valve 33 at the fluid source line 39 controls optimum inlet pressure and allows shutdown of supply. The pump 300 in FIGS. 9A and 9B is configured so that the pump housing 312 is not penetrated by the cables 20 where leakage of fluids from inside the pump housing 312 to the sea may occur, contaminating the seawater.

In FIG. 9A, the pump 300 includes four pulley cable spools 373 coaxially mounted on shaft 374. Two of the spools 373 are mounted outside the pump housing 312. The remaining two spools 373 are mounted inside the pump housing 312. One set of cables 20 depends from the float 310 at one end while the other end of the cables 20 are wound around the outside spools 373. One end of another set of cables 20 is wound on the inside spools 373 and the opposite end of the cables 20 is operatively attached to the impeller 228 within the pump housing 312. Thus, when low tide 16 rises, the float 10' rises pulling the outside cables 20 upward which rotates the outside spools 373. In turn, rotation of the outside spools 373 causes concurrent rotation of the inside spools 373 winding the inside cables 20 to thereby lift impeller 228 and discharge fluid out of pump housing 312 through backwater valve 324b. Bearing seals 376 where the shaft 374 penetrates pump housing 312 prevents leakage of fluid from inside the pump housing to seawater outside. Edge seals 387 on the perimeter of impeller 228 prevent leakage of fluids from above to below the impeller 228. When high tide 14 falls, the float 310 falls and the above process is reversed. At either tide, the rise and fall of the float 310 causes concurrent rise and fall of the impeller 228. On the upstroke of the impeller 228, the fluid is discharged through backwater valve 324b. On the downstroke of the impeller 228, the fluid is discharged through backwater valve 324a.

In FIG. 9B, the operation of the pump 300 is the substantially the same, except that the bearings seals 376 have been replaced with spherical oscillating bearings 378 and flexible seals 380. The oscillating non-rotating shaft 378 to which spools 373 are connected by permanently lubricated ball joints outside pump housing 312 are mounted on individual short shafts supported by spool shaft supports 382. Spools 373 inside the pump housing are mounted on a common shaft 375 supported by shaft supports 382. Spools 373 are connected to oscillating non-rotating shaft 378 with permanently lubricated ball joints. Since the oscillating non-rotating shaft is solidly connected to non-rotating shaft and the pump housing wall, there is no possibility of leakage unless the flexible seal 380 rips or develops holes. This is not likely because the flexible seal will be very slack and entirely non-stressed. Water pressure on both sides of pump housing 312 will cause flexible seal 380 to cling tightly to the pump housing wall. Life without leakage for flexible seal 380 in FIG. 9B will be considerably longer that of bearing seals 376 in FIG. 9A.

In both of the pumps, shown in FIGS. 9A and 9B, respectively, stops 326 limit the rise of the impeller 228 to prevent blocking of discharge of fluid through backflow prevention valve 324b. Stops 336 limit fall of impeller 228 to prevent blocking of fluid through back flow prevention valve 324a. Anchored legs 46 firmly mounts the respective pump housing 312 to the foundation 48 resting in or on sea bed 50.

Figure 10:
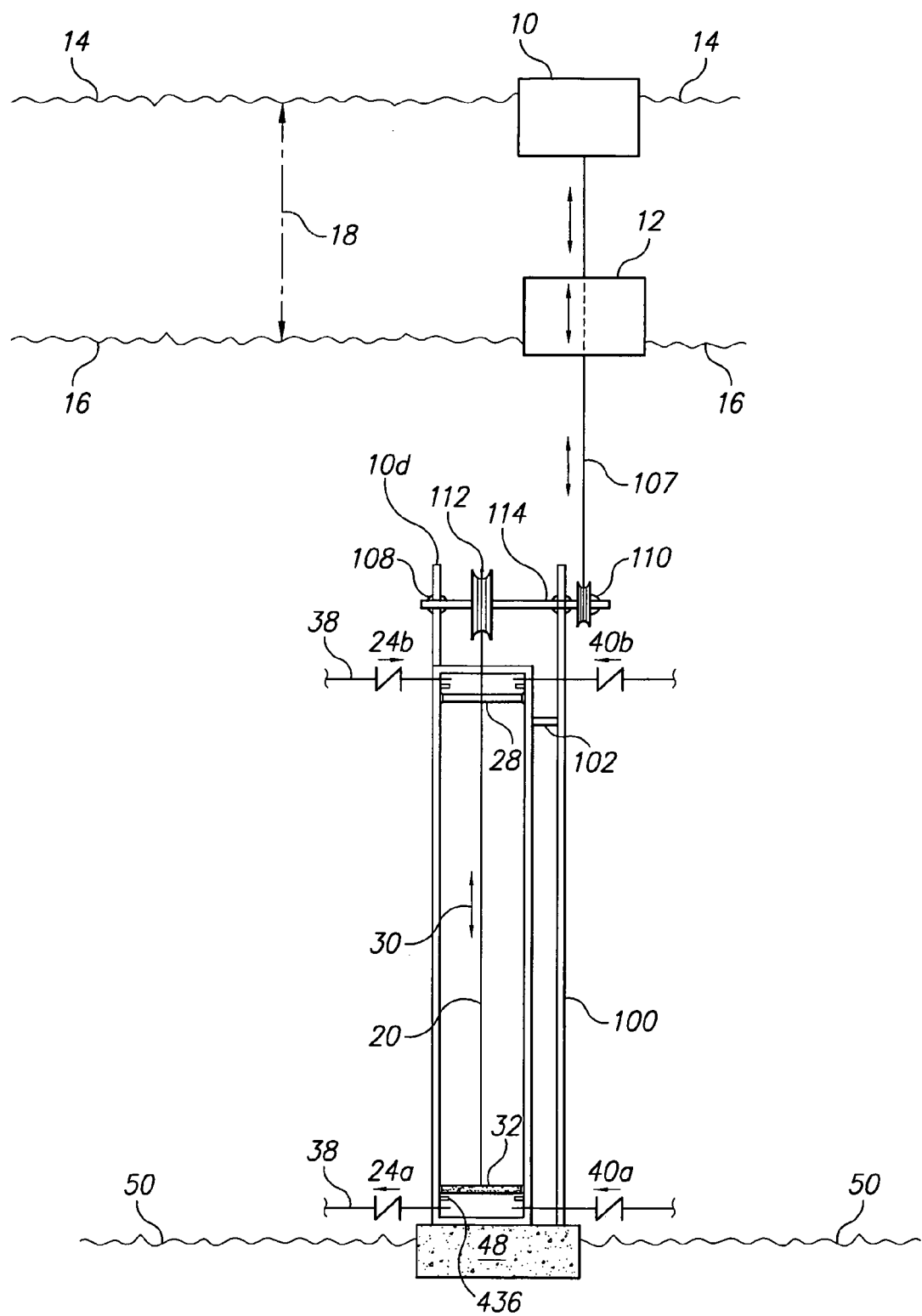
FIG. 10 is a diagrammatic view of a ninth embodiment of a high pressure fluid pump according to the present invention equipped with a tidal range multiplier.

In the embodiment shown in FIG. 10, the pump 400 includes a lever arm column 401 supporting a lever arm axis bearing 408. Braces 402 tie lever arm columns 401 together. Pump housing 412 is attached to foundation 48, which rests in or on the sea bed 50. At least one cable 407 operatively connects the float 410 to one end of the lever arm 404. The other end of the lever arm 404 includes at least one cable 20 wound around a pulley 405. The cable 20 in turn is operatively attached to the impeller 428, which is similar in most respects to the impeller 228 of the previous embodiments.

Multiplying the tidal range occurs in the same manner as noted above with respect to the embodiment of FIG. 5. However, in the current embodiment, the multiplying effect may be applied during both high and low tides, and fluid may be pumped in both the rise and fall of the impeller 428. For every rise and fall of the float 410, fluid is supplied to pump via valves 440A and 440B and discharged through valve 424B on the upstroke and valve 424A on the downstroke of the impeller 428.

Stops 426 limit rise of the impeller 428 to prevent blocking of discharge of fluid through back flow prevention valve 424B. Stops 436 limit fall of impeller 428 to prevent blocking of fluid through back flow prevention valve 424A.

Figure 11:
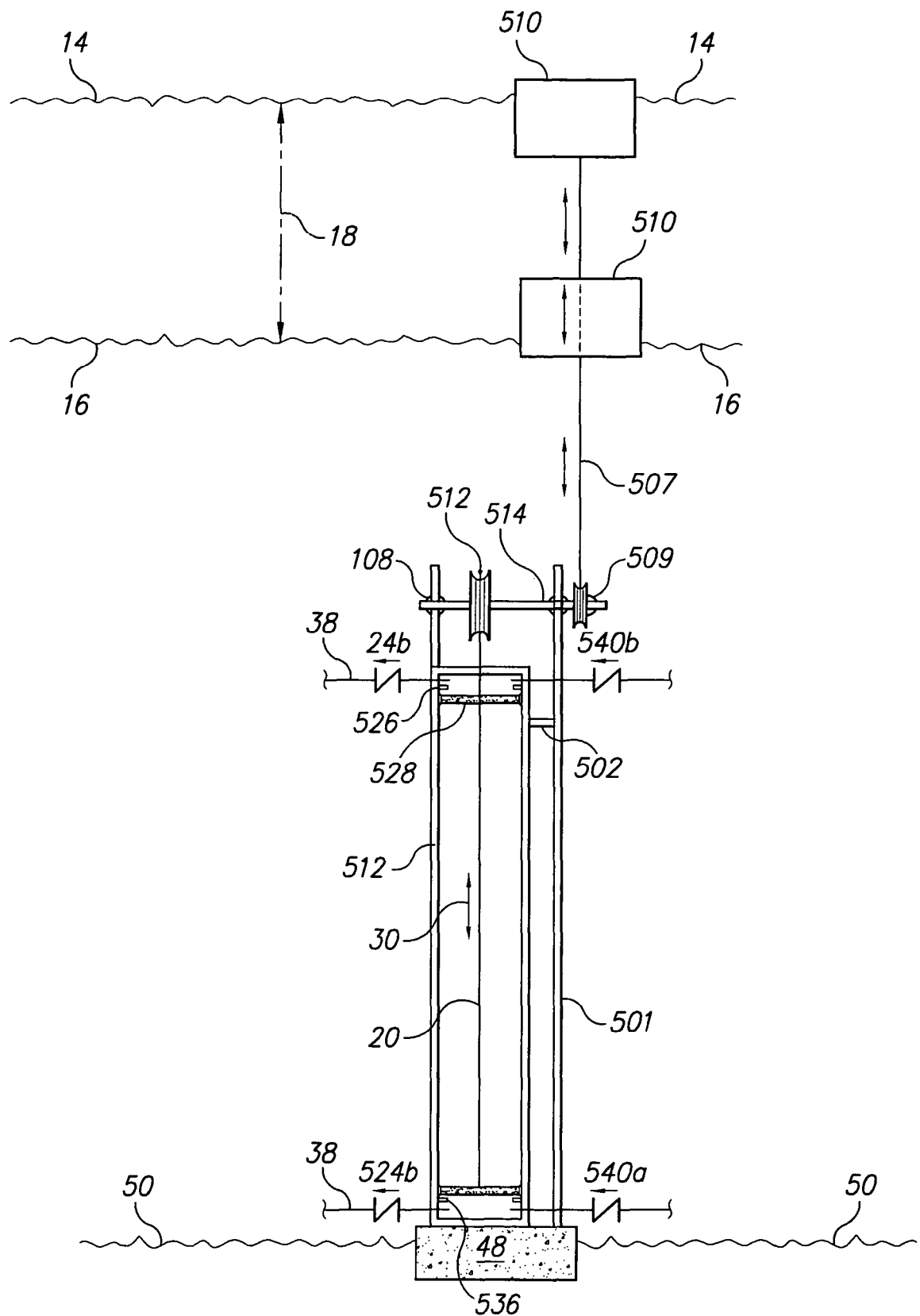
FIG. 11 is a diagrammatic view of a tenth embodiment of a high pressure fluid pump according to the present invention equipped with an alternative tidal range multiplier.

In the embodiment shown in FIG. 11, the pump 500 includes at least one shaft support column 501 supporting a pulley shaft 514 mounted through pulley shaft bearings 508 on the at least one pulley shaft column 500. Braces 502 tie shaft support column 500 to the pump housing 512 to stabilize the overall structure. Pump housing 512 is attached to foundation 48, which rests in or on the sea bed 50. A small diameter pulley 509 is mounted outside the support column 501 and a large diameter pulley 512 is mounted between the support columns 501. At least one cable 507 operatively connects the float 510 to the smaller pulley 509. At least one cable 20 is wound around the large pulley 512 and operatively attached to the impeller 528, which is similar in most respects to the impeller 228 of the previous embodiments.

Multiplying the tidal range occurs in the same manner as noted above with respect to the embodiment of FIG. 6. However, in the current embodiment, the multiplying effect may be applied during both high and low tides, and fluid may be pumped in both the rise and fall of the impeller 528. For every rise and fall of the float 510, fluid is supplied to pump via valves 540a and 540b and discharged through valve 524b on the upstroke and valve 524a on the downstroke of the impeller 528.

Stops 526 limit rise of the impeller 528 to prevent blocking of discharge of fluid through backflow prevention valve 524b. Stops 536 limit the fall of impeller 528 to prevent blocking of fluid through back flow prevention valve 524a.

Figure 12:
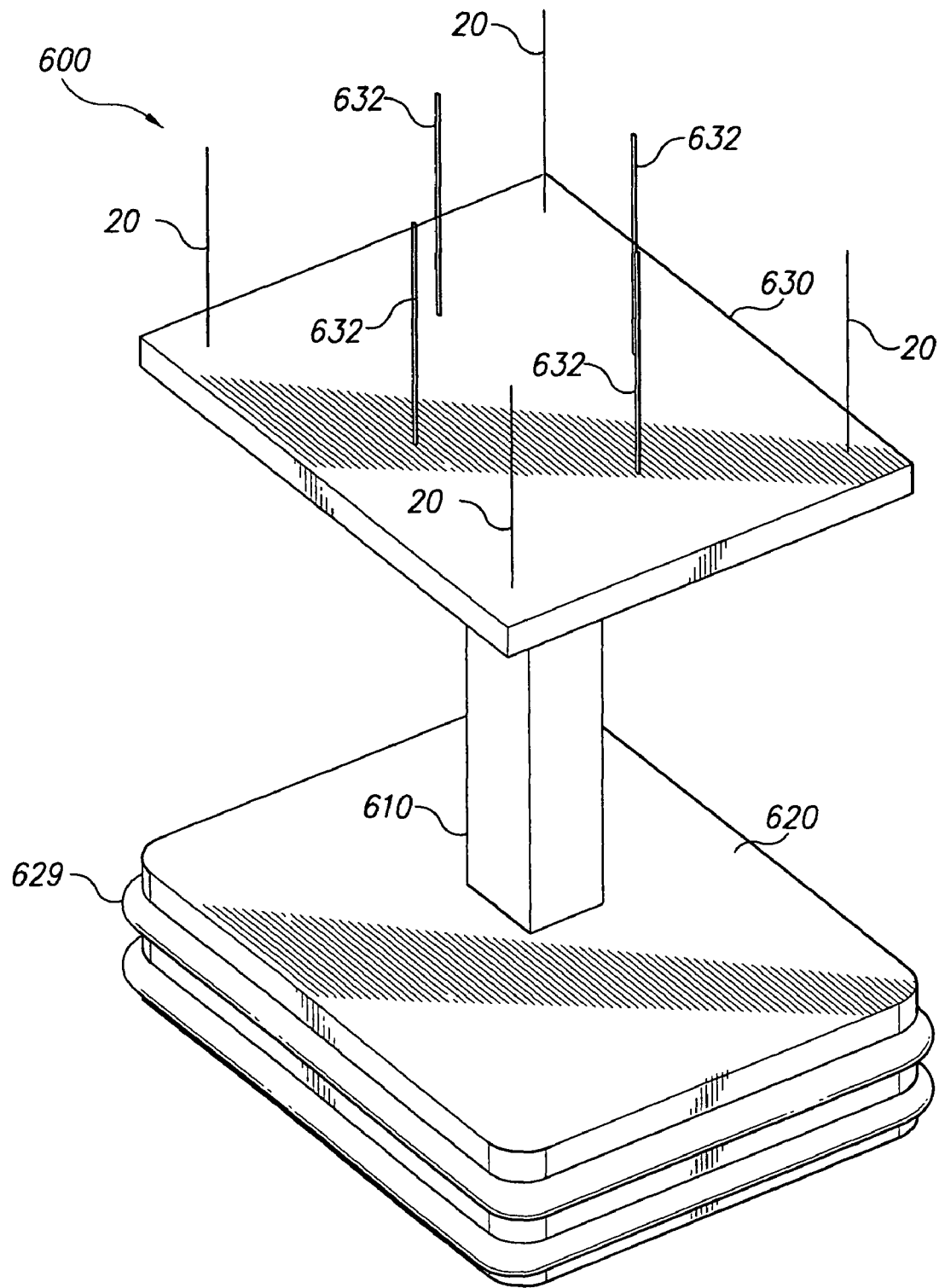
FIG. 12 is a perspective view of a further alternative impeller for a high pressure fluid pump according to the present invention.
Figure 13:
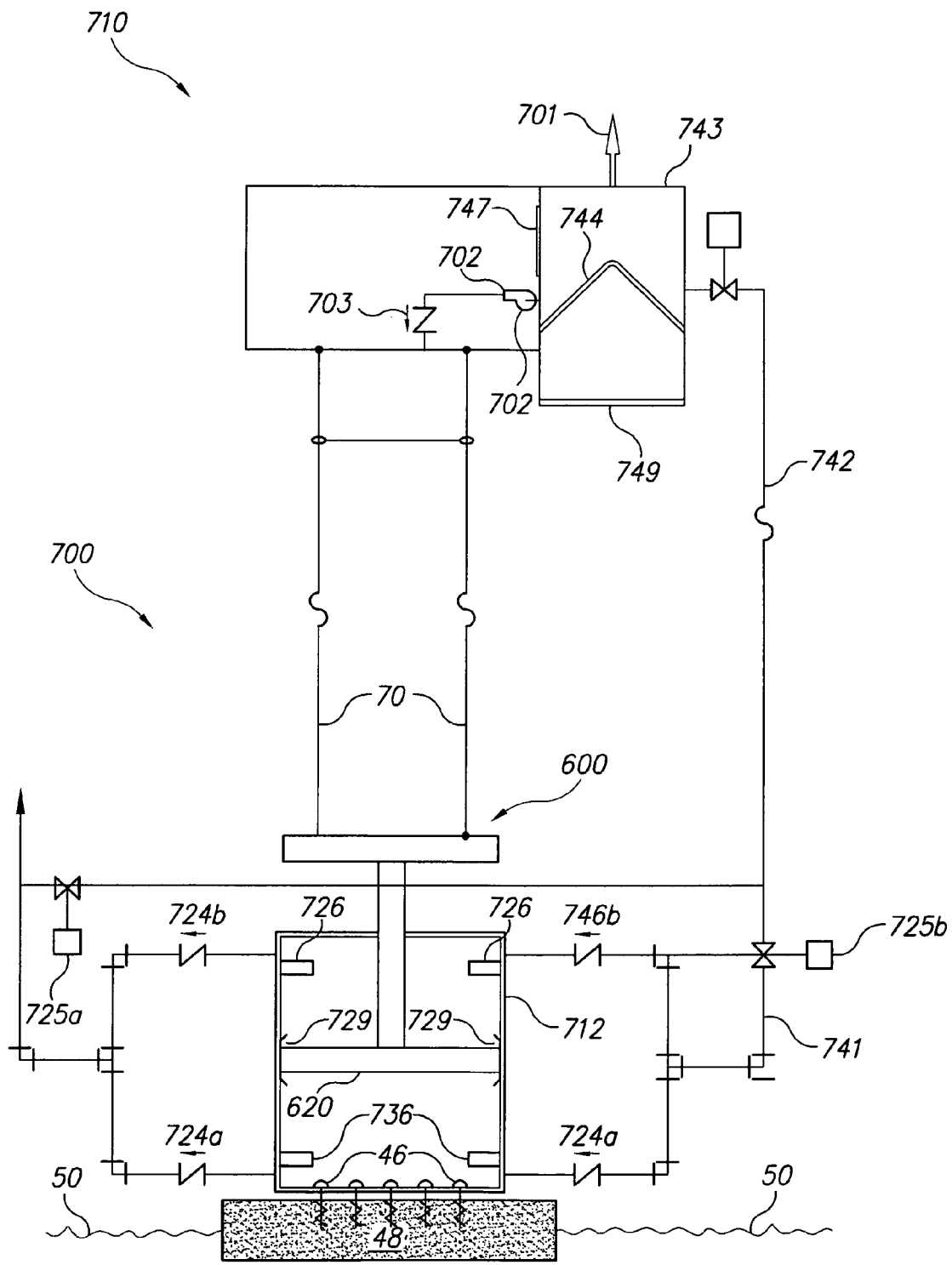
FIG. 13 is a diagrammatic view of an eleventh embodiment of a high pressure fluid pump according to the present invention utilizing the impeller of FIG. 12.
Figure 14:
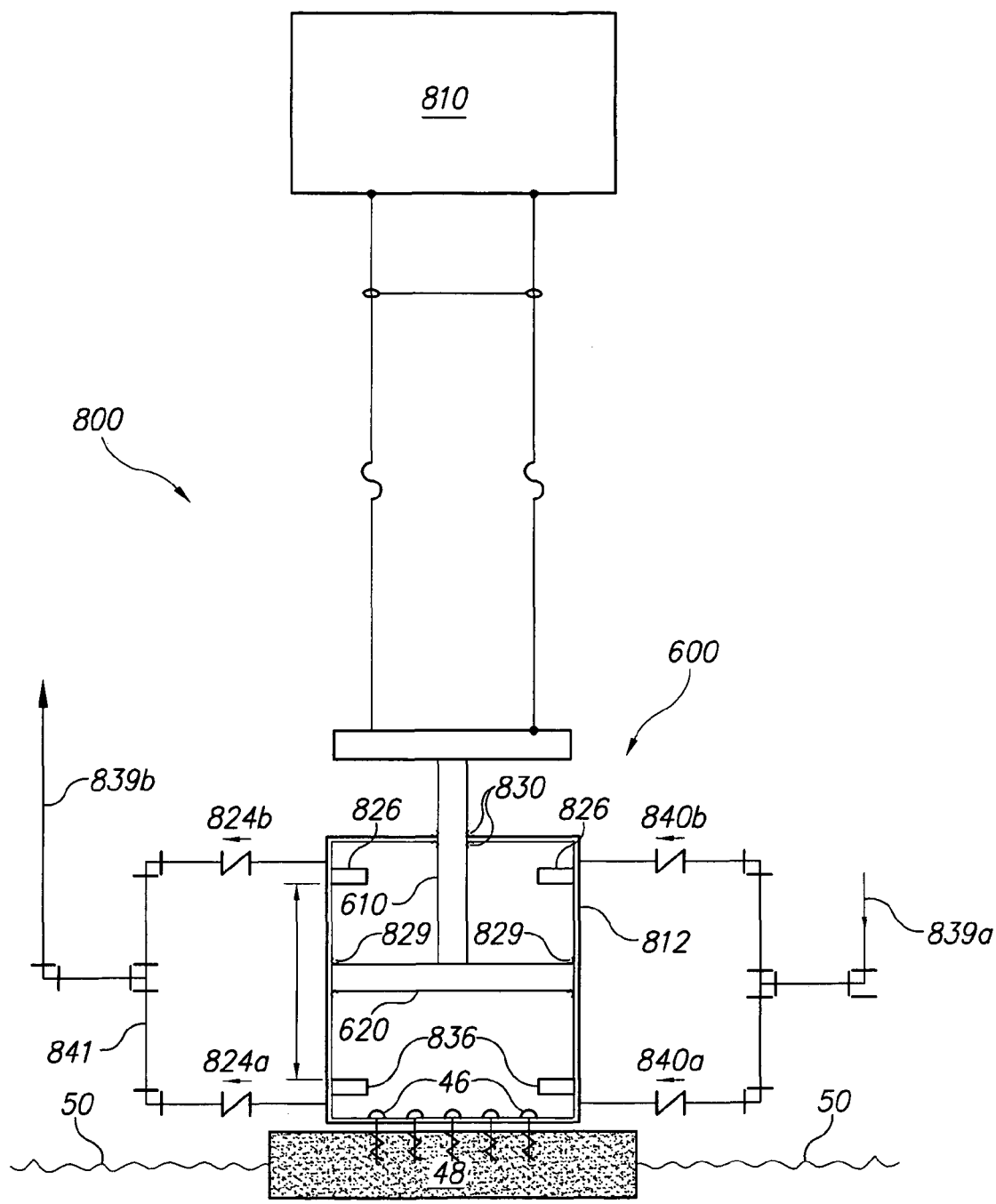
FIG. 14 is a diagrammatic view of a twelfth embodiment of a high pressure fluid pump according to the present invention utilizing the impeller of FIG. 12.

FIG. 12 discloses another alternative impeller 600. This impeller 600 is configured for easier adjustments in weight of the impeller 600 in order to optimize impeller performance. For example, if the environmental conditions prevent the impeller 600 from reciprocating within a pump housing optimally because of the weight thereof, the weight of the impeller 600 may be increased or decreased to optimum levels. FIGS. 13 and 14 respectively disclose alternative pumps utilizing the impeller 600 for pumping seawater (FIG. 13) or fluids other than seawater (FIG. 14).

The impeller 600 includes a lower body 620 substantially similar in construction as the previously mentioned impeller 228. The lower body 620 is adapted to reciprocated within a pump housing. The lower body 620 may be a square block of material, preferably corrosion resistant metal, having a density and weight capable of pumping fluids in the pump housing. Preferably two or more edge seals 629 are provided around the outside edge of the lower body 620. The lower body 620 is connected to an upper body 630 via a connecting pillar, rod or shaft 610. The upper body 630 is similar in shape as the lower body 620 and serves as the main attachment point for the cables 20 depending from a float as well as providing additional weight or weight adjusting mechanism. The upper body 630 may be fabricated with predefined thickness, density and/or material composition for the desired discharge pressure or other performance parameters, but the upper body also includes an adjustable feature or weight adjustment feature vis-à-vis the embedded weight mounting prongs 632 in the top portion of the upper body 630. The prongs are preferably rods having a semi-circular or D-shaped cross section, but other shaped rods or posts may also be used. Depending on the operating conditions of a pump, additional weight may be required. To compensate, weight blocks may be mounted to the prongs 632. These weight blocks may encompass a variety of shapes and weights. When lighter weight is required, the weight blocks may be removed from the upper body 630. It is noted that the impeller should be made from corrosion resistant material or provided with a corrosion resistant coating to increase the life thereof in the working environment. Correspondingly, the following pumps should also be similarly fabricated.

FIG. 13 discloses a pump configured to pump seawater using the impeller 600, and the operation thereof is substantially the same as the previously mentioned high pressure fluid pumps for pumping seawater. The high pressure fluid pump 700 includes a driver defined by a float 710 riding on the waves of the sea and a plurality of cables 20 depending from the float 710 and operatively attached to the fluid impeller 600 with the lower body 620 reciprocating within a pump housing 712. The pump housing 712 is firmly seated on a foundation 48 by anchors 46, and the foundation in turn is embedded on the sea floor 50. Edge seals 729 minimize leakage on the edges of impeller lower body 620. These seals 729 may be provided in addition to the edge seals 629. In addition, pump housing seals 730 may be provided to minimize leaks between the housing 712 and the environment.

The interior of pump 700 is open to sea through two inlet valves 740a, 740b, which are interconnected by rigid pipe 741 and connected to automatic valve 725b. The backwash valve 725a is in operative communication with the automatic valve 725b via pipe 741. A flexible pipe 742 connects the automatic valve 725b to a filter float housing 743, which is attached to the float 710 and floats therewith at sea level. Filter float housing 743 includes filters 744 and a screen or strainer 749. Air may be vented through vent holes as indicated by arrow 701. A hinged access panel 747 interconnects the float 710 with the filter float housing 748 to allow cleaning and/or changing of the filters and screen. The float 710 would also include a panel on the float 710 to gain access to the interior thereof similar to the high pressure fluid pump 200 in FIG. 6. Any excess seawater within the filter housing 743 may be pumped back to sea by a pump 702 through the backflow prevention valve 703.

As the float 710 rides the high and low tides 14, 16 over tidal range 18, it generates and releases tension in the cables 20, which respectively raise and lower the impeller 600 riding inside pump housing 712. The downstroke of the impeller 600 applies pressure to fluid below the impeller lower body 620 forcing it to discharge through outlet back flow prevention valve 724a to point of use or storage and fluid is pulled in to the top side of the impeller lower body 620 through inlet back flow prevention valve 740b. The upstroke of the impeller 600 pressurize the fluid above the impeller lower body 620, and the fluid is forced out through back flow prevention valve 724b to point of use or storage while fluid is pulled in to the bottom side of the impeller lower body 620 through inlet back flow prevention valve 740a.

Stops 726 limit rise of the impeller lower body 620 to prevent blocking of discharge of fluid through backflow valve 724b and intake of seawater opening through backflow valve 740b. Stops 736 limit fall of the impeller lower body 620 to prevent blocking of discharge of fluid through backflow valve 224a and intake of seawater opening through backflow valve 240a.

FIG. 14 discloses a pump configured to pump fluids other than seawater using the impeller 600, and the operation thereof is substantially the same as the previously mentioned high pressure fluid pumps for pumping fluids other than seawater. The high pressure fluid pump 800 includes a driver defined by a float 810 riding on the waves of the sea and a plurality of cables 20 depending from the float 810 and operatively attached to the fluid impeller 600 with the lower body 620 reciprocating within a pump housing 812. The pump housing 812 is firmly seated on a foundation 48 by anchors 46, and the foundation in turn is embedded on the sea floor 50. Edge seals 829 minimize leakage on the edges of impeller lower body 620. These seals 829 may be provided in addition to the edge seals 629. In addition, pump housing seals 830 may be provided to minimize leaks between the housing 812 and the environment.

Fluid other than seawater is supplied to the interior of the pump housing 312 from a source line 839a through two inlet valves 840a, 840b, which are interconnected by rigid pipe 841. As the float 810 rides the high and low tides 14, 16 over tidal range 18, it generates and releases tension in the cables 20, which respectively raise and lower the impeller 600 riding inside pump housing 812. The downstroke of the impeller 600 applies pressure to fluid below the impeller lower body 620 forcing it to discharge through outlet back flow prevention valve 824a to point of use or storage via outlet line 839b, and fluid is pulled in to the top side of the impeller lower body 620 through inlet back flow prevention valve 840b. The upstroke of the impeller 600 pressurize the fluid above the impeller lower body 620, and the fluid is forced out through back flow prevention valve 824b to point of use or storage via outlet line 839b while fluid is pulled in to the bottom side of the impeller lower body 620 through inlet back flow prevention valve 840a.

Stops 826 limit rise of the impeller lower body 620 to prevent blocking of discharge of fluid through backflow valve 824b and intake of seawater opening through backflow valve 840b. Stops 836 limit fall of the impeller lower body 620 to prevent blocking of discharge of fluid through backflow valve 824a and intake of seawater opening through backflow valve 840a.

It is to be understood that the present invention is not limited to the embodiments described above, but encompasses any and all embodiments within the scope of the following claims.

I claim:

1. A high pressure fluid pump, comprising:
 a pump housing adapted for attachment to a foundation on a bed of a body of water, the pump housing defining a pump chamber having an inlet and an outlet;
 upper and lower stops disposed in the pump chamber;
 an impeller having a one-way valve mechanism, the impeller being capable of reciprocating in the pump chamber between the upper and lower stops;
 a filter disposed at a lower end of the pump chamber adjacent the inlet;
 a float adapted for riding on the surface of the body of water, both vertically and horizontally;
 a tether connecting the float to the impeller, the tether extending through the pump housing;
 an outlet pipe connected to the pump chamber outlet;
 a backflow prevention valve disposed in the outlet pipe;
 a backwash and flushing pipe connected to the outlet pipe; and
 a motorized valve disposed in the backwash and flushing pipe, the backwash and flushing pipe directing pressurized fluid from the outlet pipe to the filter in the pump chamber to flush and clean the filter.

2. The high pressure fluid pump according to claim 1, further comprising a solar collector attached to said float, the solar collector providing power to the motorized valve in the backwash and flushing pipe.

3. The high pressure fluid pump of claim 1, further comprising a lever arm forming a tidal range multiplier and a cable attached to said float, the lever arm having a first and a second end, the first end being connected to said tether and the second end connected to the cable.

4. The high pressure fluid pump according to claim 1, wherein said one-way valve mechanism includes an adjustable counterweight disposed within the impeller to adjust pressure required to open the valve mechanism.

5. A high pressure fluid pump for use in a body of water, comprising:
   a pump housing adapted for attachment to a foundation on a bed of the body of water, the pump housing defining a pump chamber having an inlet and an outlet;
   an outlet pipe connected to the pump chamber outlet;
   a backflow prevention valve disposed in the outlet pipe;
   a pair of outer pulleys mounted adjacent the pump housing;
   a pair of inner pulleys mounted within the pump chamber;
   upper and lower stops disposed in the pump housing;
   an impeller having a one-way valve mechanism, the impeller being capable of reciprocation in the pump chamber between the upper and lower stops;
   a cable connecting each of the inner pulleys to the impeller;
   a float adapted for riding on the surface of the body of water, both vertically and horizontally;
   float cables extending towards the pump housing, each float cable having a first end connected to the float and a second end attached to one of the outer pulleys mounted adjacent the pump housing; and
   means for connecting the pair of outer pulleys to the pair of inner pulleys in a driving relationship.

6. The high pressure fluid pump according to claim 5, wherein said means for connecting said pair of outer pulleys to said pair of inner pulleys comprises a common shaft having said pair of outer pulleys and said pair of inner pulleys mounted thereon.

7. The high pressure fluid pump according to claim 5, wherein said means for connecting said pair of outer pulleys to said pair of inner pulleys comprises a spherical oscillating bearing mechanism attaching the pulleys to said shaft.

8. The high pressure fluid pump according to claim 5, wherein said one-way valve mechanism includes an adjustable counterweight disposed within the impeller to adjust pressure required to open the valve mechanism.

9. A high pressure fluid pump for use in a body of water, the pump comprising:
   a pump housing adapted for attachment to a foundation on a bed of the body of water, the pump housing defining a pump chamber having at least one inlet and at least one outlet;
   upper and lower stops disposed in the pump chamber;
   an impeller capable of reciprocating in the pump chamber between the upper and lower stops, the impeller being substantially solid and non-porous;
   a float adapted for riding on the surface of the body of water, both vertically and horizontally;
   at least one connection member connecting the float to the impeller, the at least one connection member extending into the pump chamber, wherein said at least one connection member comprises a plurality of connection members;
   a pair of outer pulleys mounted adjacent the pump housing, at least two of said connection members being connected to said float and the outer pulleys, each of the connection members baying a first end connected to said float and a second end attached to one of the outer pulleys,
   a pair of inner pulleys mounted within the pump chamber, each of said inner pulleys being connected to the impeller by one of said connection members,
   means for connecting the pair of outer pulleys to the pair of inner pulleys in a driving relationship;
   at least one inlet pipe connected to the at least one pump chamber inlet and below the lower stops;
   a backflow prevention valve disposed in the at least one inlet pipe;
   at least one outlet pipe connected to the at least one pump chamber outlet and below the lower stops; and
   a backflow prevention valve disposed in the at least one outlet pipe.

10. The high pressure fluid pump according to claim 9, further comprising a filter assembly attached to the float.

11. The high pressure fluid pump according to claim 10, wherein said filter assembly includes:
    a housing;
    at least one filter and a filter screen disposed within the filter housing; and
    a hinged access panel disposed atop of the filter housing, the panel allowing access to the at least one filter and the screen for maintenance, the panel being sealed to prevent air from entering said float.

12. The high pressure fluid pump according to claim 9, further comprising at least one motorized valve operatively connected to said at least one inlet pipe for regulating fluid flow through said inlet backflow prevention valve.

13. The high pressure fluid pump according to claim 9, wherein said impeller includes at least one edge seal for preventing respective fluid flow wound said impeller from above and below said impeller.

14. The high pressure fluid pump according to claim 9, wherein said means for connecting said pair of outer pulleys to said pair of inner pulleys comprises a common shaft having each of said outer pulleys and said inner pulleys mounted thereon.

15. The high pressure fluid pump according to claim 14, wherein said means for connecting said pair of outer pulleys to said pair of inner pulleys includes a spherical oscillating bearing mechanism mounting said pulleys to the shaft.

16. The high pressure fluid pump according to claim 9, further comprising a seal disposed between said outer pulleys and said inner pulleys, the seal being selected from the group consisting of a bearing and a flexible seal.

17. The high pressure fluid pump according to claim 9, wherein said at least one connection member comprises a plurality of connection members, the pump further comprising:
    at least one lever arm column disposed adjacent the pump housing;
    at least an upper cross brace and a lower cross brace between the at least one lever arm column and the pump housing to provide structural support therebetween;
    a pulley disposed at a distal end of the upper cross brace; and
    an elongated lever arm pivotally supported on the lever arm column, the lever arm having a short segment and a long segment, a first said connection members having one end attached said float and an opposite end attached to a distal end of the short segment and a second said connection member having one end attached to a distal end of the long segment, the second connection member being wound through the pulley and having an opposite end attached said impeller;

wherein, for a given tidal range, operation of the lever arm via said float provides leverage for pumping a greater amount of fluid through the pump chamber.

18. The high pressure fluid pump according to claim 9, wherein said at least one connection member comprises a plurality of connection members, the pump further comprising:

at least one support column disposed adjacent the pump housing;

at least one cross brace disposed between the at least one support column and the pump housing to provide structural support therebetween;

an outer pulley disposed outside the at least one support column, the outer pulley having a small diameter;

an inner pulley having a large diameter;

a common shaft, the inner and outer pulleys being coaxially mounted on the shaft;

a first said connection member having one end attached said float and an opposite end operatively attached to said small outer pulley; and a second said connection member having one end operatively attached to said large inner pulley and an opposite end attached to said impeller;

wherein, for a given tidal range, operation of the small outer pulley via said float concurrently rotates the large inner pulley to thereby provide leverage for pumping a greater amount of fluid through the pump chamber.

19. The high pressure fluid pump according to claim 9, wherein said impeller comprises:

a substantially block shaped lower body adapted to reciprocate within said pump housing, said lower body having an outside edge;

at least one seal surrounding the outside edge of said lower body;

a substantially block shaped upper body adapted to connect to said at least one connection member;

an elongated shaft connecting said upper body to said lower body; and a weight adjustment assembly disposed on top of said upper body.

* * * * *